United States Patent
Aiba

(10) Patent No.: US 9,042,714 B2
(45) Date of Patent: May 26, 2015

(54) DOME-SHAPE CAMERA

(71) Applicant: FUJIFILM CORPORATION, Tokyo (JP)

(72) Inventor: Daigo Aiba, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/455,962

(22) Filed: Aug. 11, 2014

(65) Prior Publication Data

US 2014/0348498 A1    Nov. 27, 2014

Related U.S. Application Data

(63) Continuation of application No. PCT/JP2013/051985, filed on Jan. 30, 2013.

(30) Foreign Application Priority Data

Feb. 14, 2012   (JP) ................................. 2012-029445

(51) Int. Cl.
*G03B 13/32*       (2006.01)
*G08B 13/196*      (2006.01)
(Continued)

(52) U.S. Cl.
CPC .............. *G03B 37/02* (2013.01); *G03B 13/32* (2013.01); *G03B 17/02* (2013.01); *H04N 5/2252* (2013.01); *H04N 5/2253* (2013.01); *H04N 5/2254* (2013.01); *H04N 5/2259* (2013.01); *G03B 17/561* (2013.01); *G03B 2205/00* (2013.01); *F16M 13/02* (2013.01); *F16M 13/027* (2013.01); *F16M 11/10* (2013.01); *F16M 11/18* (2013.01);
(Continued)

(58) Field of Classification Search
CPC .... G03B 13/32; G03B 13/34; G08B 13/1963; G08B 13/19617; H04N 5/2252; F16M 13/027; F16M 11/2014
USPC .................. 396/427–428, 72, 79; 348/143
See application file for complete search history.

(56) References Cited

U.S. PATENT DOCUMENTS 7,387,453 B2 *   6/2008   Arbuckle ...................... 396/419
2007/0268596 A1*  11/2007  Aiba et al. .................... 359/696
(Continued)

FOREIGN PATENT DOCUMENTS

JP    2007-006397    1/2007
JP    2008-17258     1/2008
(Continued)

OTHER PUBLICATIONS

International Search Report—PCT/JP2013/051985—Mar. 19, 2013.

*Primary Examiner* — Christopher Mahoney
(74) *Attorney, Agent, or Firm* — Young & Thompson

(57) ABSTRACT

A dome-shaped camera comprising: a camera body including a focus adjustment ring for manually performing focus adjustment; a base part which supports the camera body and includes a tilt mechanism which changes an angle of a tilt direction for supporting the camera body; a dome cover which covers the camera body; a mount device which mounts the dome cover on the base part so that the dome cover is rotatable about a center axis of the dome cover; and a power transmitting device which transmits a rotating force in a direction about the center axis added to the dome cover as a rotating force of a focus adjustment ring of the camera supported at any angle in the tilt direction via a power transmission member placed on a tilt axis.

9 Claims, 14 Drawing Sheets

(51) Int. Cl.
   *G03B 37/02*   (2006.01)
   *G03B 17/02*   (2006.01)
   *H04N 5/225*   (2006.01)
   *G03B 17/56*   (2006.01)
   *F16M 13/02*   (2006.01)
   *F16M 11/10*   (2006.01)
   *F16M 11/18*   (2006.01)
   *F16M 11/20*   (2006.01)
   *G03B 13/34*   (2006.01)
   *H04N 5/372*   (2011.01)
(52) U.S. Cl.
   CPC ....... *F16M 11/2014* (2013.01); *G08B 13/1963* (2013.01); *G03B 13/34* (2013.01); *H04N 5/372* (2013.01)

(56) References Cited

U.S. PATENT DOCUMENTS

2008/0181600 A1\* 7/2008 Martos .......................... 396/427
2009/0303325 A1   12/2009 Mizuno
2011/0096164 A1\* 4/2011 Mori et al. ..................... 348/143

FOREIGN PATENT DOCUMENTS

JP   2008-172423   7/2008
JP   2011-170118   9/2011

\* cited by examiner

DOME-SHAPE CAMERA

CROSS-REFERENCE TO RELATED APPLICATIONS

This application is a Continuation of PCT International Application No. PCT/JP2013/051985 filed on Jan. 30, 2013, which claims priority under 35 U.S.C §119(a) to Japanese Patent Application No. 2012-29445 filed on Feb. 14, 2012. Each of the above application(s) is hereby expressly incorporated by reference, in its entirety, into the present application.

BACKGROUND OF THE INVENTION

1. Field of the Invention

The present invention relates to a dome-shaped camera and, in particular, a dome-shaped camera for use with a camera body accommodated in a dome cover set on the ceiling, wall, or the like of a facility or building for the purpose of monitoring and others.

2. Description of the Related Art

Conventionally, a dome-shaped camera for use as being set on the ceiling, wall, or the like of a facility or building for monitoring or the like has been known. The dome-shaped camera includes a camera body which obtains as subject image as an image signal (video signal) by an imaging device, a base part which support the camera body, and a dome cover mounted on the base part so as to cover the camera body for the purpose of protecting the camera body or the like.

Also, in the dome-shaped camera, a varifocal lens, is often used as an optical system of the camera body. In those using the varifocal lens, focus adjustment is performed by manually performing a rotating operation on a focus adjustment ring generally provided on a lens barrel.

As such, in the dome-shaped camera of the type manually performing focus adjustment, after the base part is set on the ceiling, wall, or the like of an imaging location, focus adjustment is performed with the dome cover removed from the base part, and then the dome cover is mounted on the base part to complete a dome-shaped camera setting operation.

On the other hand, conventionally, when the dome cover is mounted after focus adjustment is performed as described above, the focus position deviates owing to a change of an optical path length, the influence of a lens effect, and so on due to the dome cover, thereby causing the subject at a desired position to become out of focus, which is a known inconvenience.

To resolve this inconvenience, the following suggestion has been presented.

In Japanese Patent Application Laid-Open No. 2011-170118 (Patent Literature 1), while focus adjustment is being manually performed with the dome cover removed, from a shift amount of the focus position due to the dome cover and an appropriate focus position with the dome cover removed, a focus position as an appropriate focus position with the dome cover mounted can be found as a target focus position. And, when the focus position becomes that target focus position while a user is performing focus adjustment, the user is notified as such by blinking of an LED or the like. According to this, the user can perform focus adjustment with the dome cover removed so as to achieve an appropriate focus position when the dome cover is mounted.

In Japanese Patent Application Laid-Open No. 2008-172423 (Patent Literature 2), when the dome cover is mounted after the user performs focus adjustment or the like with the dome cover (case member) removed, a deviation amount (defocus amount) of the focus position due to mounting of the dome cover is found based on information about the dome cover and information about the specifications of a lens device, and focus adjustment is automatically performed so as to make correction by that deviation amount.

In Japanese Patent Application Laid-Open No. 2008-17258 (Patent Literature 3), the dome cover is provided with a cover parameter indicating an influence of the dome cover onto an optical path length. When the dome cover is mounted, focus adjustment is performed based on the cover parameter so that a deviation of the focus position due to mounting of the dome cover is corrected. Regarding focus adjustment, a mode of performing back focus adjustment by moving an image-pickup element by a motor and a mode in which a parameter corresponding shape portion corresponding to the cover parameter is formed on the dome cover and back focus adjustment is performed by mechanically moving the image-pickup element by using a parameter corresponding shape portion have been suggested.

SUMMARY OF THE INVENTION

However, the above-described Patent Literature 1 has a drawback of requiring an expensive control device such as a circuit for calculating a shift amount of the focus position due to the dome cover. Moreover, since an appropriate focus position is determined based on an AF value (a high-frequency component of a spatial frequency value) obtained from a capture image, there is a drawback in which a user-desired focus position cannot be determined as an appropriate focus position.

Also, in the above-described Patent Literature 2, a focus control mechanism for performing focus adjustment in a motor-driven manner is required. Therefore, there is a drawback of an increase in cost as a device.

Moreover, in the above-described Patent Literature 3, in a mode including a focus control mechanism for performing focus adjustment in a motor-driven manner, cost is increased by that focus control mechanism.

By contrast, in Patent Literature 3, in a mode in which the image-pickup element is mechanically moved by a parameter corresponding shape portion formed on the dome cover, the focus control mechanism as described above or the like is not required, and therefore an increase in cost due to this does not occur.

However, an object of the above-described Patent Literature 3 is to correct a shift amount of the focus position due to the dome cover, and what is only possible is to shift the focus position to a nearby side with respect to a focus position with the dome cover removed. Moreover, the focus position can be shifted only within a range of the shift amount corresponding to the parameter corresponding shape portion formed on the dome cover.

On the other hand, the thickness of the dome cover may vary for each individual, and a tilt mechanism capable of changing the orientation for supporting the camera body in a tilt direction is included, a change amount of the optical path length due to mounting of the dome cover may not necessarily be constant even if the type of dome cover is the same, since a positional relation between the camera body and the dome cover varies by the tilt angle of the camera angle.

Thus, in the mode disclosed in Patent Literature 3, a deviation of the focus position may not be appropriately corrected. Therefore, it is desired to not only allow a deviation of the focus position to be corrected by a mechanical mechanism as in Patent Literature 3 but also allow normal focus adjustment equivalent to the case when a rotating operation is performed on the focus adjustment ring to be manually performed even with the dome cover mounted.

Also, in the dome-shaped camera, the tilt angle can be generally adjusted as adjustment of orientation of the camera body in the dome cover. Thus, it is required to allow focus adjustment to be manually performed with the dome cover mounted, at whichever tilt angle the camera boy is supported.

The present invention was made in view of these circumstances, and has an object of providing a dome-shaped camera allowing focus adjustment equivalent to that achieved by performing a rotating operation on a focus adjustment ring of a camera body to be manually performed even with the dome cover is mounted, without inviting an increase in cost.

To achieve the object above, a dome-shaped camera according to the present invention includes a camera body including a focus adjustment ring for manually performing focus adjustment, a base part which supports the camera body and includes a tilt mechanism which changes an angle of a tilt direction for supporting the camera body, a dome cover which covers the camera body, a mount device which mounts the dome cover on the base part so that the dome cover is rotatable about a center axis of the dome cover, and a power transmitting device which transmits a rotating force in a direction about the center axis added to the dome cover as a rotating force of a focus adjustment ring of the camera supported at any angle in the tilt direction via a power transmission member placed on a tilt axis.

According to the present invention, by manually performing a rotating operation on the dome cover, the focus adjustment ring can be rotated, and focus adjustment equivalent to the case in which a rotating operation is performed directly on the focus adjustment ring can be performed. Therefore, after focus adjustment is performed with the dome cover removed from the base part, a deviation of the focus position occurring due to mounting of the dome cover can be appropriately corrected. Also, it is not only possible to correct this deviation of the focus position but also possible to perform focus adjustment with the dome cover mounted on the base part. Therefore, the need for focus adjustment with the dome cove removed from the base part can be also eliminated. Furthermore, the manual rotating force of the dome cover is transmitted mechanically to the focus adjustment ring to allow focus adjustment with the dome cover mounted on the base part. Therefore, an expensive control mechanism is not required, and manufacturing cost can be lowered.

The power transmitting device of the present invention can include a first gear line which transmits the rotating force of the dome cover about the center axis as a rotating force of the power transmission member rotating about the tilt axis, and a second gear line which transmits the rotating force about the tilt axis transmitted from the dome cover to the power transmission member as a rotating force of the focus adjustment ring. According to this, when a rotating operation is manually performed on the dome cover, its power is transmitted to the power transmitting member via the first gear line, and the power transmitted to the power transmitting member is transmitted to the focus adjustment ring via the second gear line.

Also, the first gear line can include a first gear placed in a circumferential shape about the center axis at a rear end part of the dome cover, and a second gear provided to the power transmission member on the tilt axis and coupled to the first gear, and the second gear line can include a third gear provided to the power transmission member on the tilt angle, a fourth gear provided to a rotating member rotatably supported about an axis parallel to a rotation axis of the focus adjustment ring, the fourth gear coupled to the third gear, a fifth gear provided to the rotating member, and a sixth gear provided to the rotating member, the sixth gear coupled to the fifth gear. According o this, the number of gears can be decreased, and a reduction in the number of components and reduction in cost can be achieved.

Furthermore, the first gear can be formed on a rotating member fixed to a rear end part of the dome cover. That is, the first gear may not formed on the dome cover and may be formed on another member fixed to the dome cover Still further, a regulating device which regulates rotation of the dome cover is preferably included. According to this, it is possible to prevent in advance the dome cover from rotating due to a shock, vibration, or the like after focus adjustment by a rotating operation on the dome cover to cause the focus position to deviate.

Still further, the mount device can include a cover fixing ring in an annular shape fixed to the base part, and a flange part formed at the rear end part of the dome cover can be interposed between the cover fixing ring and the base part. According to this, the structure of the mount device which mounts the dome cover on the base part can be simplified to reduce cost.

Still further, the mount device can include a cover rotation fixing ring in an annular shape screwed into an inner circumferential part of the cover fixing ring, and the dome-shaped camera can include a regulating device which regulates rotation of the dome cover by pressing the flange part onto the base part by the cover rotation fixing ring. According to this, only by performing a rotating operation on the cover rotation fixing ring, switching can be made between the state of preventing rotation of the dome cover and the state of allowing rotation of the dome cover to perform focus adjustment.

The base part can include a pan mechanism which changes an angle of a pan direction of supporting the camera body. The present invention can transmit the rotating force of the dome cover to the focus adjustment ring even when the camera body is supported by the pan mechanism at any pan angle.

The camera body can have a varifocal lens as a lens barrel. The varifocal lens is inexpensive, and it is general to manually perform a rotating operation on the focus adjustment ring. Therefore, this is preferable when the present invention is applied.

According to the present invention, focus adjustment equivalent to that achieved by performing a rotating operation on a focus adjustment ring of a camera body can be manually performed even with the dome cover is mounted, without inviting an increase in cost.

DETAILED DESCRIPTION OF THE PREFERRED EMBODIMENTS

A Preferred embodiment of the present invention is described below with reference to the attached drawings.

Figure 1:
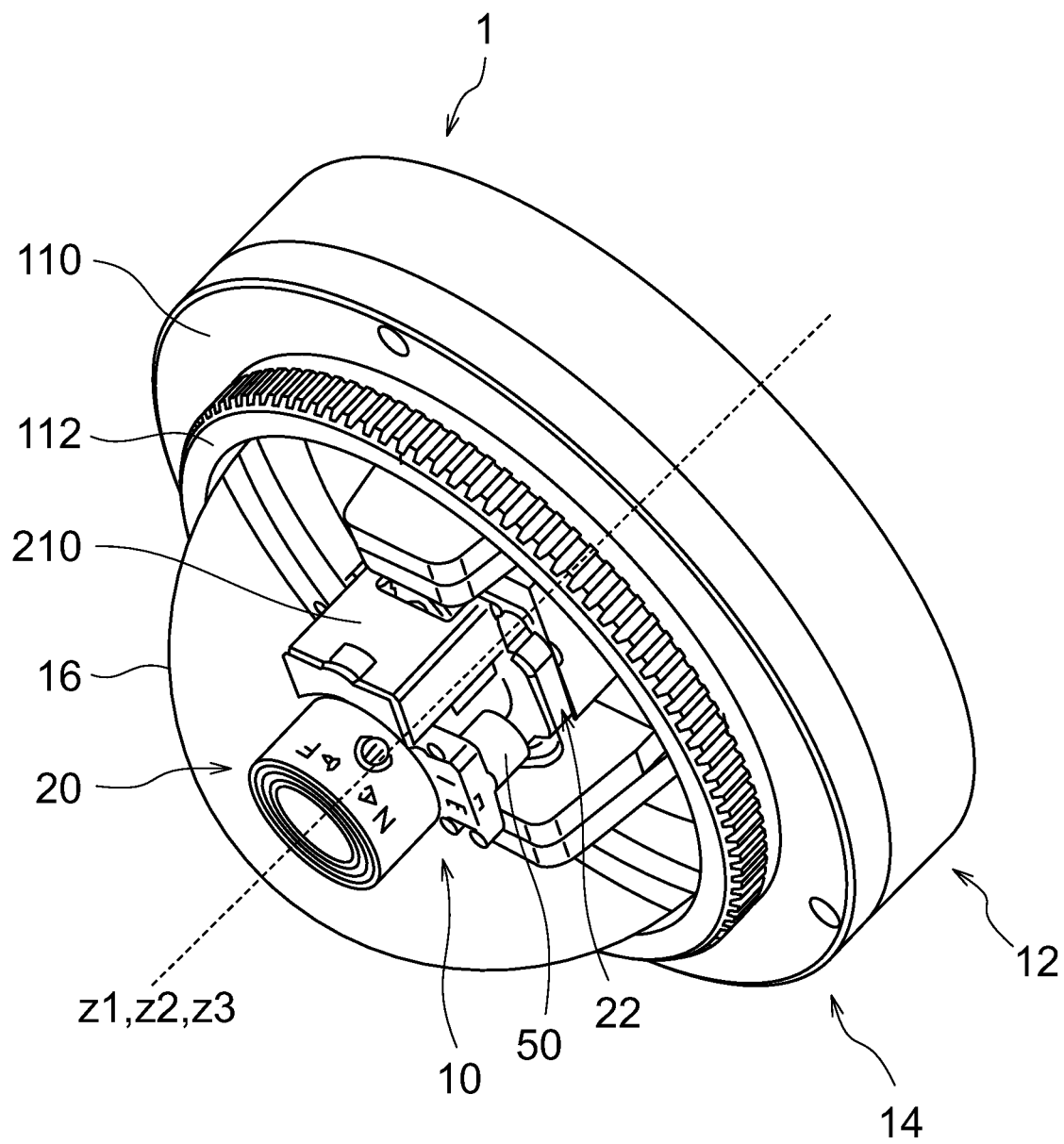
FIG. 1 is an entire perspective view of the state in which a dome cover (cover part) of a dome-shaped camera to which the present invention is applied is mounted.
Figure 2:
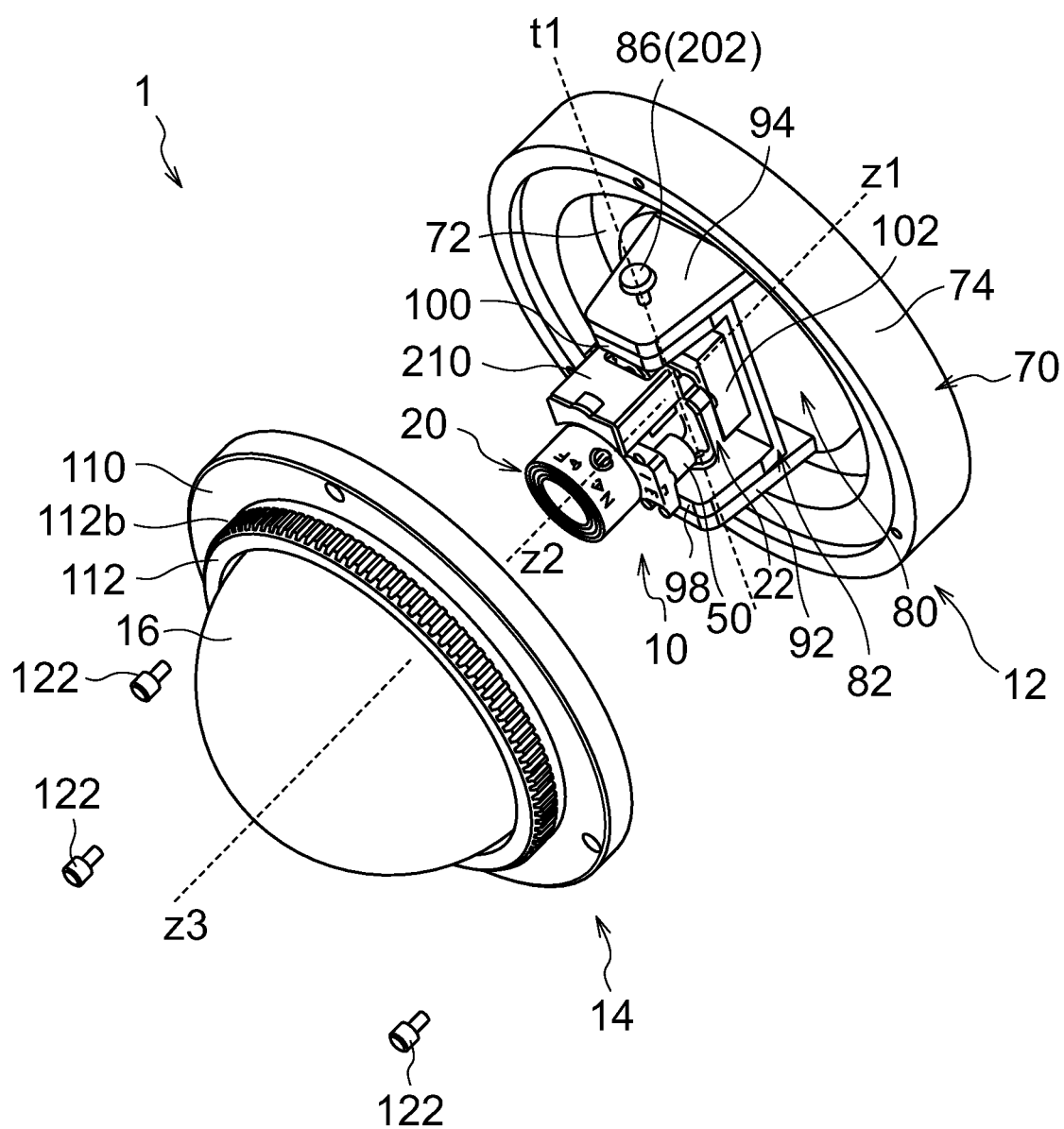
FIG. 2 is an entire perspective view of the state in which the dome cover (cover part) of the dome-shaped camera is removed.
Figure 3:
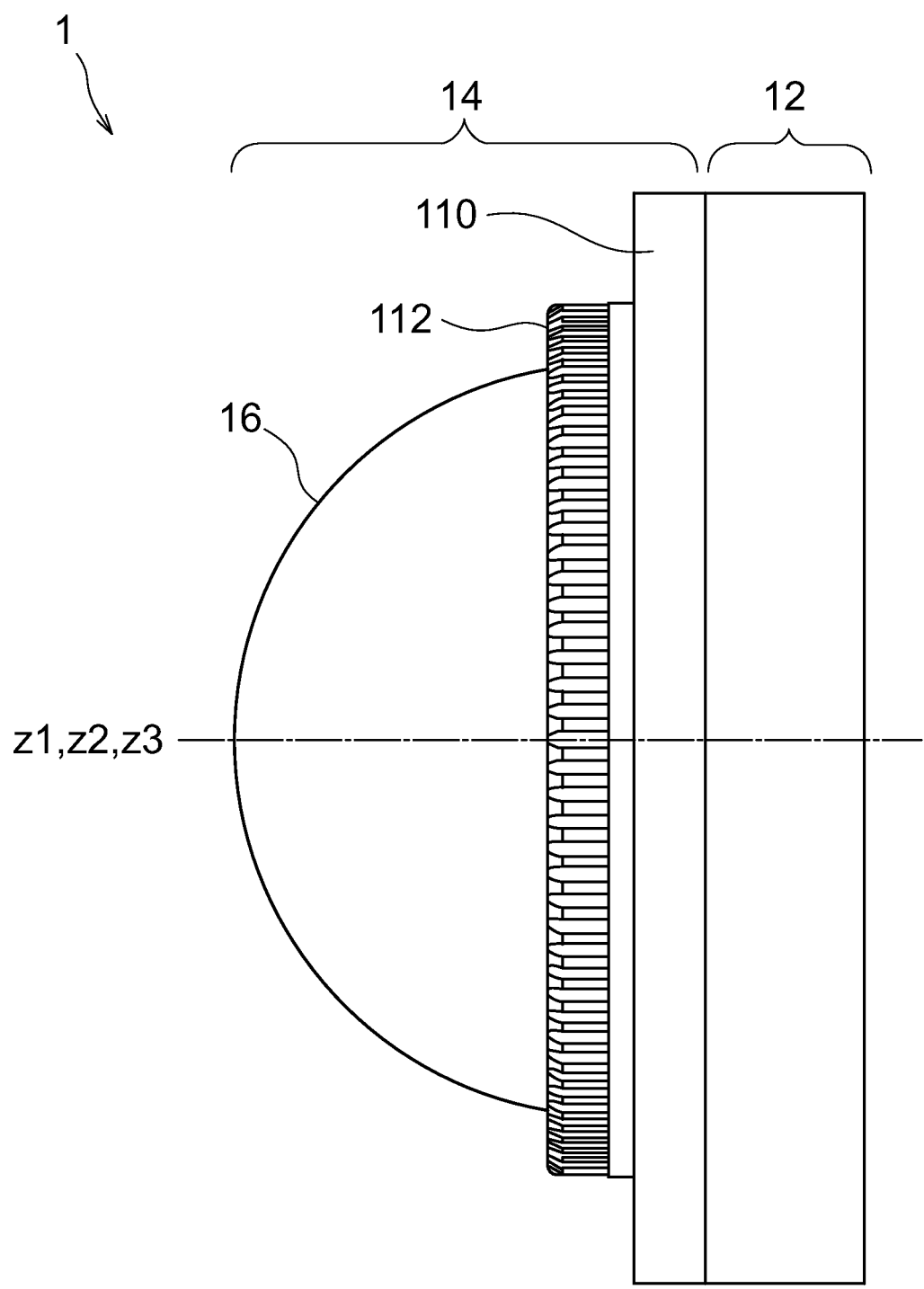
FIG. 3 is a plan view (upper surface view) of the dome-shaped camera in the state of FIG. 1 depicted from an upper surface side.
Figure 4:
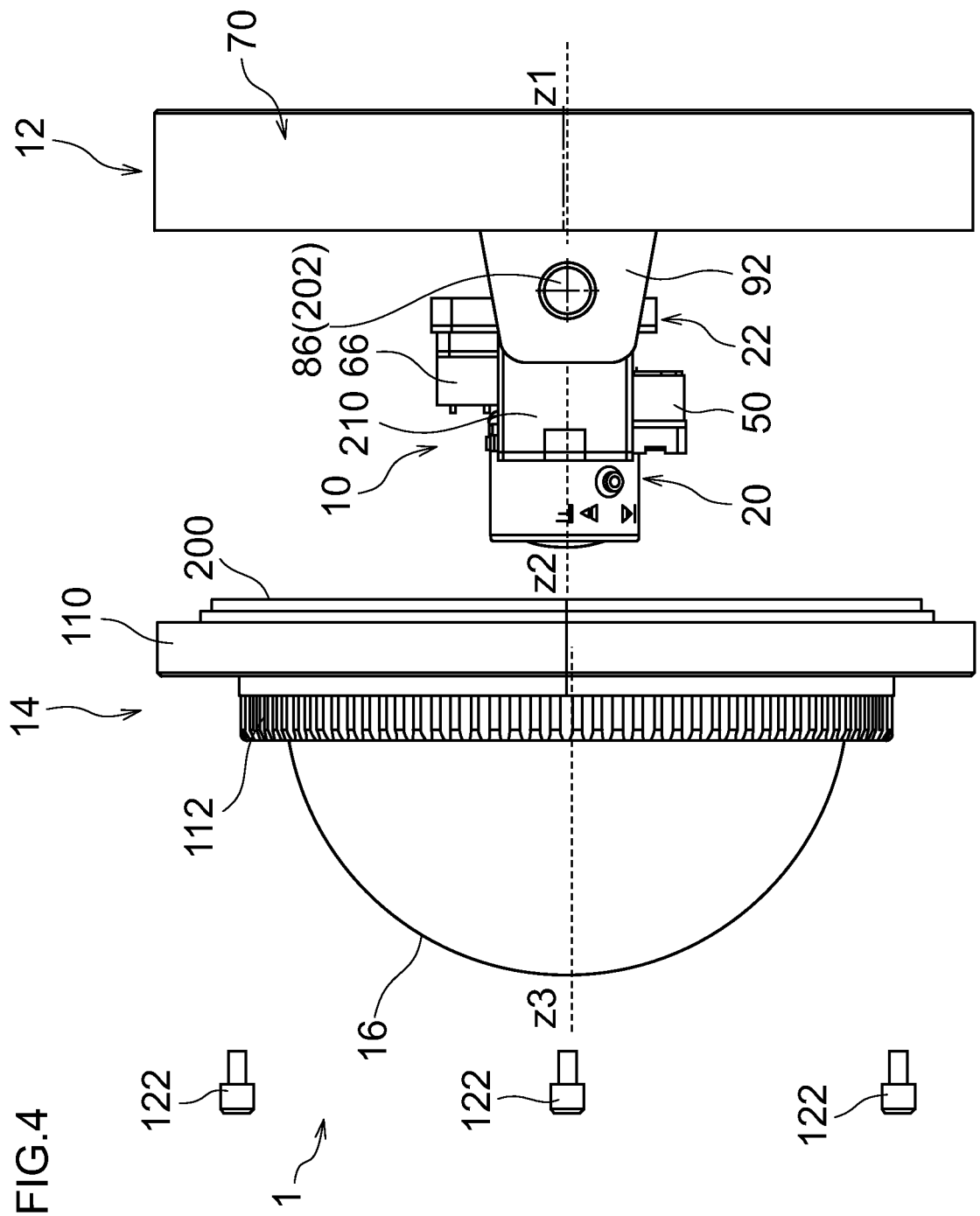
FIG. 4 is a plan view (upper surface view) of each part of the dome-shaped camera in the state of FIG. 2 depicted from an upper surface side.

FIG. 1 is an entire perspective view of the state in which a dome cover 16 (cover part 14) of a dome-shaped camera 1 to which the present invention is applied is mounted, and FIG. 2 is an entire perspective view of the state in which the dome cover 16 (cover part 14) is removed from the dome-shaped camera 1. FIG. 3 is a plan view of the dome-shaped camera 1 in the state of FIG. 1 depicted from an upper surface side, and FIG. 4 is a plan view of each part of the dome-shaped camera 1 in the state of FIG. 2 depicted from an upper surface side. Note in the exploded views of FIG. 2 and FIG. 4 that each part is placed so that a center axis z1 of a base part 12, a center axis (optical axis) z2 of a camera body 10, and a center axis z3 of the dome cover 16 are coaxial with one another.

As depicted in FIG. 1 to FIG. 4, the dome-shaped camera of the present embodiment includes the camera body 10, the base part 12 supporting the camera body 10, and the cover part 14 for covering a peripheral part of the camera body 10 with the dome cover 16.

The camera body 10 is an imaging device which images a subject in a predetermined imaging in a predetermined angle-of-view range, and includes a component (such as a lens) of an optical system for forming a subject image in a manner as will be described further below, and an imaging device which converts the subject image formed by the optical system into an electrical signal for obtainment as an image signal (video signal). As the camera body, one which obtains a still-picture image signal, one which obtains a moving-picture image signal, and one which obtains both can be used. However, the camera body 10 of the present embodiment is assumed to be an imaging device which obtains a moving-picture image signal (video signal).

Note that the center axis z2 of the camera body 10 represents the optical axis of the optical system in each drawing, and is hereinafter referred to as an optical axis z2.

As depicted in FIG. 1 to FIG. 4, the base part 12, with its center axis z1 and the optical axis z2 of the camera body 10 on the same axis to support the camera body 10, is placed at the rear side of the camera body 10. Also, as will be described further below, the base part 12 includes a pan mechanism which takes the center axis z1 as a rotation axis and rotatably supports the camera body 10 in a direction about the center axis z1, that is, a rotating direction (pan direction) with the center axis z1 as a rotation axis, and a tilt mechanism which takes an axis orthogonal to the center axis z1 as a tilt axis t1 (refer to FIG. 2) and rotatably supports the camera body 10 in a direction about the tilt axis t1, that is, a rotating direction (tilt direction) with the tilt axis t1 as a rotation axis. And, the orientation (imaging direction) of the camera body 10 is adjusted by these pan mechanism and tilt mechanism to allow the camera body 10 to be held in the adjusted state.

The cover part 14 is removably mounted on the front side of the base part 12 with screws 122, 122, 122 (refer to FIG. 2 and FIG. 4). When the cover part 14 is mounted on the base part 12, the camera body 10 is accommodated in an inner space surrounded by the dome cover 16 of the cover part 14 and the base part 12, and the camera body 10 is protected so as not to receive external influences (such as rain, wind, and destructive activities). Also, as the dome cover 16, one subjected to smoke processing or the like can be used and, with this, it is also possible to make it difficult to view the camera body 10 from outside.

Here, an example of the operation procedure from setting the dome-shaped camera 1 of the present embodiment at an imaging location for monitoring or the like to performing adjustment (orientation adjustment and optical adjustment) of the camera body 10 is described. First, the base part 12 is fixedly set on the ceiling or wall of the imaging location. Then, as depicted in FIG. 2 and FIG. 4, with the dome cover 16 (cover part 14) removed from the base part 12, a power supply and a monitor are connected to a power supply cable and a signal cable extended from the base part 12, these cables not depicted in the drawings. With this, the camera body 10 is activated, and video imaged by the camera body 10 is displayed on the monitor. Subsequently, with the dome cover 16 (cover part 14) removed from the base part 12 as in FIG. 2 and FIG. 4, adjustment of the camera body 10 (orientation adjustment and optical adjustment of the camera body 10) is manually performed while checking the imaged video displayed on the monitor. With this, the camera body 10 is adjusted so as to be in an appropriate state for imaging a subject at a desired location of the imaging location (a desired imaging direction and imaging distance).

When adjustment of the camera body 10 ends, the dome cover 16 (cover part 14) is mounted on the base part 12, as depicted in FIG. 1 and FIG. 3.

Here, with the dome cover 16 intervening in an optical path of subject light incident to the optical system of the camera body 10, a focus position (a position of the imaging in focus) is deviated with respect to the state with the dome cover 16 removed.

On the other hand, the dome-shaped camera 1 of the present embodiment, even in the state with the dome cover 16 mounted thereon, focus adjustment of the camera body 10 can be performed by manually performing a rotating operation on the dome cover 16 about the center axis z3.

Thus, after the dome cover 16 is mounted on the base part 12, a rotating operation is manually performed on the dome cover 16 while imaged video displayed on the monitor is being checked, thereby correcting a deviation of the focus position due to mounting of the dome cover 16.

When the above-described operation ends, the operation of adjusting the camera body 10 when setting the dome-shaped camera 1 ends.

Subsequently, the structure of each of the camera body 10, the base part 12, and the cover part 14 is described in detail.

Figure 5:
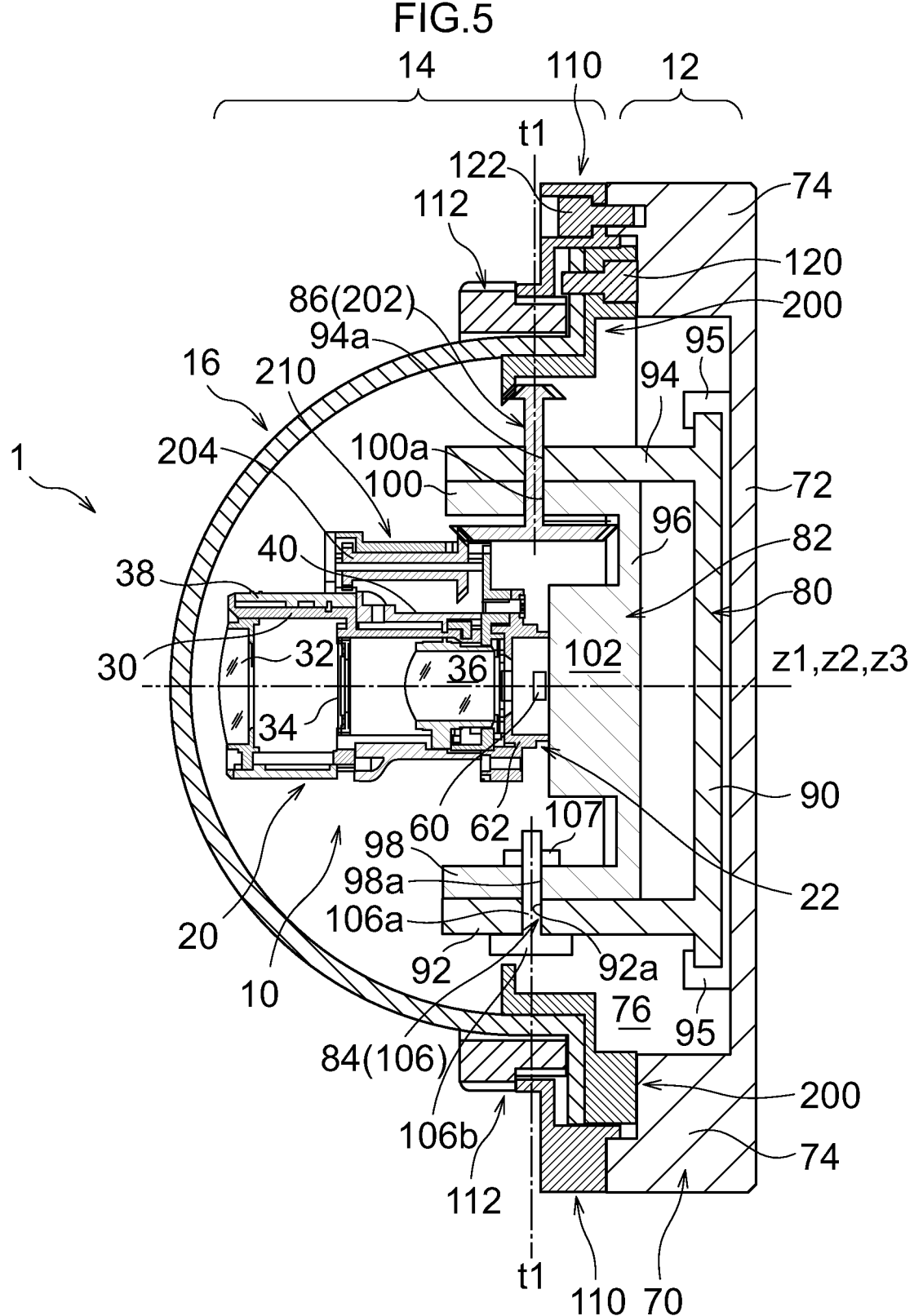
FIG. 5 is a sectional view of the dome-shaped camera in the state of FIG. 1 cut out along a plane in a vertical direction passing through center axes of a base part, a camera body, and the dome cover.

The camera body 10 depicted in FIG. 1, FIG. 2, and FIG. 4 is configured of the lens barrel 20, an imaging unit 22 placed at the rear end side of the lens barrel 20, as also depicted in FIG. 5. Note that FIG. 5 is a sectional view of the dome-shaped camera 1 with the cover part 14 (dome cover 16) mounted on the base part 12 as in FIG. 1 in the state of FIG. 1, the dome-shaped camera 1 cut out along a plane in a vertical direction passing through the center axes z2, z1, and z3 of the camera body 10, the base part 12, and the dome cover 16.

To the lens barrel 20, the optical system for forming a subject image is placed as an optical system of the camera body 10. An image of subject light entering the optical system from the front end of the lens barrel 20, passing through the optical system, and then exiting from the rear end of the lens barrel 20 is formed in the imaging unit 22. In the imaging unit 22, a solid-state image-pickup element 60 such as a CCD image-pickup element is placed as an imaging device of the camera body 10. A subject image formed by the optical system of the lens barrel 20 on a light-receiving surface (imaging surface) of the solid-state image-pickup element is subjected to photoelectric conversion to be obtained as an image signal (video signal).

In the present embodiment, a lens barrel configuring a varifocal lens of variable focus is used as the lens barrel 20. As depicted in FIG. 5, the lens barrel 20 includes a cylindrical fixing pipe 30 which directly or indirectly supports components of the lens barrel 20; a first lens group 32 for focus adjustment, an iris 34 of an iris device, and a second lens group 36 for scaling (for focal-length adjustment) which are sequentially placed from a front side (objective side) inside the fixing pipe 30; and a focus adjustment ring 38 and a scaling ring 40 sequentially placed from the front side outside the fixing pipe 30. And, by manually performing a rotating operation on the focus adjustment ring 38, the first lens group 32 is moved in a direction of the optical axis z2 to allow focus adjustment. By manually performing a rotating operation on the scaling ring 40, the second lens group 36 is moved in the direction of the optical axis z2 to allow magnification adjustment (focal length adjustment). The iris 34 is automatically controlled by motor driving based on a video signal obtained from the camera body 10.

Figure 6:
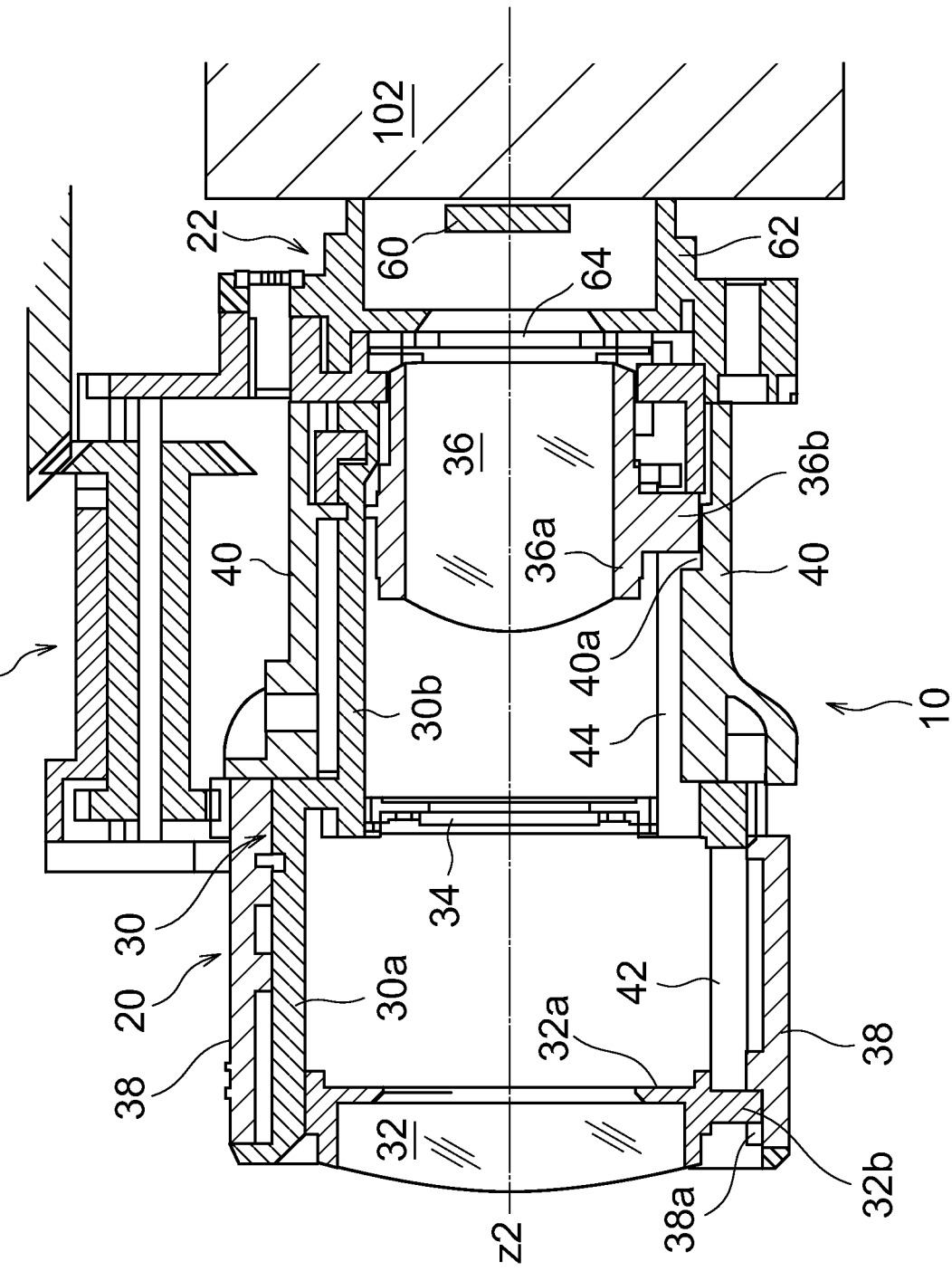
FIG. 6 is an enlarged sectional view of a portion of the camera body in FIG. 5.

FIG. 6 is an enlarged sectional view of a portion of the camera body 10 in FIG. 5. As depicted in FIG. 6, the fixing pipe 30 includes a front-side fixing pipe 30a on the front side formed in a cylindrical shape and a rear-side fixing pipe 30b on the rear side, and is configured by integrally coupling the front-side fixing pipe 30a and the rear-side fixing pipe 30b with its diameter reduced more than that of the front-side fixing pipe 30a. In the front-side fixing pipe 30a and the rear-side fixing pipe 30b, a rectilinear grooves 42 and 44, respectively, extending in the direction of the optical axis z2, which is also the center axis of the fixing pipe 30, are formed.

Inside the front-side fixing pipe 30a, the first lens group 32 for focus adjustment is held and placed in a lens holding frame 32a. On an outer circumferential part of the lens holding frame 32a, an engaging pin 32b is provided so as to project toward the outside, and is placed at a location where the engaging pin 32b is inserted into the rectilinear groove 42 of the front-side fixing pipe 30a. With this, the first lens group 32 is supported so as to be rectilinearly movable in the direction of the optical axis z2 with rotation about the optical axis z2 regulated.

On an outer circumferential part of the front-side fixing pipe 30a, the focus adjustment ring 38 in a cylindrical shape is rotatably supported. On the inner circumferential surface of the focus adjustment ring 38, a cam groove 38a is formed. In the cam groove 38a, the engaging pin 32b inserted in the rectilinear groove 42 is engaged. With this, when a rotating operation is performed on the focus adjustment ring 38, an intersecting position between the cam groove 38a and the rectilinear groove 42 formed on the inner circumferential surface is changed, and also the engaging pin 32b moves to the intersecting position to cause the first lens group 32 to make a rectilinear movement in a direction along the optical axis z2. When the first lens group 32 is displaced to the direction along the optical axis z2, the focus position (the position of the subject in focus) is changed. Therefore, focus adjustment can be performed by rotating the focus adjustment ring 38.

Inside the rear-side fixing pipe 30b, the second lens group 36 for scaling is held and placed in a lens holding frame 36a. On an outer circumferential part of the lens holding frame 36a, an engaging pin 36b is provided so as to project toward the outside, and is placed at a location where the engaging pin 36b is inserted into the rectilinear groove 44 of the rear-side fixing pipe 30b. With this, the second lens group 36 is supported so as to be rectilinearly movable in the direction of the optical axis z2 with rotation about the optical axis z2 regulated.

On an outer circumferential part of the rear-side fixing pipe 30b, the scaling ring 40 in a cylindrical shape is rotatably supported. On the inner circumferential surface of the scaling ring 40, a cam groove 40a is formed. In the cam groove 40a, the engaging pin 36b inserted in the rectilinear groove 44 is engaged. With this, when a rotating operation is performed on the scaling ring 40, an intersecting position between the cam groove 34a and the rectilinear groove 44 formed on the inner circumferential surface is changed, and also the engaging pin 36b moves to the intersecting position to cause the second lens group 36 to make a rectilinear movement in the direction along the optical axis z2. When the second lens group 36 is displaced to the direction along the optical axis z2, the focal length is changed. Therefore, magnification adjustment (focal length adjustment) can be performed by rotating the scaling ring 40.

At a boundary portion between the front-side fixing pipe 30a and the rear-side fixing pipe 30b inside the fixing pipe 30, the iris (iris blades) 34 of the iris device is placed. Although details are omitted herein, the iris device includes a motor 50 which drives the iris 34 to the outside of the lens barrel 20 as depicted in FIG. 2 and FIG. 4. With that motor 50, the iris 34 performs an opening/closing operation in a motor-drive manner to change the aperture diameter of the iris 34. Adjustment of the aperture diameter of the iris 34 is automatically controlled based on a video signal obtained by the camera body 10 according to brightness of video.

Note that rotating operations of the focus adjustment ring 38 and the scaling ring 40 are performed only manually. As depicted in FIG. 2, with the cover part 14 removed from the base part 12, rotating operations on these rings are manually performed, thereby allowing focus adjustment and magnification adjustment.

On the other hand, with a cover-interlocked-type focus adjustment mechanism, which will be described further below, the focus adjustment ring 38 can be indirectly rotated by manually performing a rotating operation on the dome cover 16 even with the cover part 14 mounted on the base part 12 as in FIG. 1, thereby allowing focus adjustment. In FIG. 1, FIG. 2, and FIG. 4 to FIG. 6, a gearwheel support part 210 placed on a side part of the lens barrel 20 is a component part of that cover-interlocked-type focus adjustment mechanism, which will be described in detail further below.

As depicted in FIG. 6, the imaging unit 22 placed at the rear end side of the lens barrel 20 includes a holder (frame body) 62 which accommodates and holds a substrate not depicted in the drawing where the solid-state image-pickup element 60 is mounted.

A holder 62 is mounted at the rear end part of the lens barrel 20 (the rear end part of the rear-side fixing pipe 30b) and is also fixed to a pedestal part 102 (which will b be described further below) of the base part 12. With this, the entire camera body 10 formed of the lens barrel 20 and the imaging unit 22 is supported by the base part 12 via the pedestal part 102.

When the holder 62 is mounted on the rear end part of the lens barrel 20, the solid-state image-pickup element 60 held by the holder 62 is placed at a location where the center axis of an imaging plane is coaxial with the optical axis z2, and subject light passing through the optical system of the lens barrel 20 enters the imaging plane. With this, the subject image formed on the imaging plane of the solid-state image-pickup element 60 is subjected to photoelectric conversion to be obtained as an image signal (video signal).

Also, the imaging unit 22 includes a filter device which inserts and removes an optical filter 64 of a predetermined type into and from an optical path through which the subject light passes on the front side of the imaging plane of the solid-state image-pickup element 60. As depicted in FIG. 4, the filter device includes a motor 66 supported by the holder 62. By driving the motor 66 with a remote operation or the like, the optical filter 64 is inserted and removed into and from the optical path. For example, filters of two types as optical filters can be switched to be inserted into the optical path. By using a filter which lets infrared rays pass through and a filter which cuts infrared rays as filters, switching can be made between imaging with visible light and imaging with infrared light in accordance with the situation of the imaging location or the like.

Next, the base part 12 depicted in FIG. 1 to FIG. 4 is described.

The base part 12 includes a pan mechanism which takes the center axis z1 of the base part 12 as a pan axis and rotatably supports the camera body 10 in the direction about the center axis z1 (pan direction) and a tilt mechanism which takes the axis orthogonal to the center axis z1 as the tilt axis t1 and rotatably supports the camera body 10 in the direction about the tilt axis t1 (tilt direction), as described above.

As depicted in FIG. 5, the base part 12 includes a foundation part 70 as an outermost frame body. The foundation part 70 has a disk-shaped bottom wall part 72, a peripheral wall part 74 which surrounds a circumferential edge part, and a recessed part 76 surrounded by these bottom wall part 72 and the peripheral wall part 74. And, in the recessed part 76, a pan-purpose rotating table 80 configuring a pan mechanism and a tilt-purpose rotating table 82 configuring a tilt mechanism are placed.

The pan-purpose rotating table 80 includes a disk-shaped disk part 90 and two plate-shaped support parts 92 and 94 (refer to FIG. 2) provided to stand from two locations on the front surface of the disk part 90 toward the front.

The disk part 90 is supported by a support frame 95 fixedly attached to the bottom wall part 72 of the base part 12 at a location so as to have a center axis serving as the center axis z1 of the base part 12, and is rotatably supported about the center axis z1.

The two support parts 92 and 94 are placed to face each other at locations so as to be symmetrical with respect to the center axis z1 (the center axis of the disk part). The support parts 92 and 94 have tilt shaft holes 92a and 94a into which tilt shaft members 84 and 86 (which will be described further below), respectively, which support the tilt-purpose rotating table 82, are inserted According to the pan mechanism including this pan-purpose rotating table 80, when the pan-purpose rotating table 80 rotates about the center axis z1 of the base part 12, the tilt-purpose rotating table 82 supported by the pan-purpose rotating table 80 rotates about the center axis z1 as will be described further below, and the camera body 10 supported by the tilt-purpose rotating table 82 takes the center axis z1 as a pan axis and rotates in a pan direction about the center axis z1.

That is, with the cover part 14 removed from the base part 12, by an operator gripping the camera body 10 and adding a rotating force in the pan direction to the camera body 10, the pan-purpose rotating table 80 rotates in the direction of the rotating force to rotate the camera body 10 in the pan direction. Therefore, as the orientation of the camera body 10, the rotation angle in the pan direction can be adjusted.

Also, although structural description is omitted, the pan mechanism is provided with a rotation regulating device which regulates (disables) rotation of the pan-purpose rotating table 80, thereby allowing the camera body 10 to be fixed as being set at a desired rotation angle in the pan direction. As an example of the rotation regulating device, an abutting member (such as a screw) which can be switched between an abutting state and a non-abutting state is preferably provided to any portion of the pan-purpose rotating table 80 (for example, the disk part 90). According to this, by setting the abutting member to a non-abutting state, rotation of the pan-purpose rotating table 80 is enabled, and the rotation angle of the camera body 10 in the pan direction can be adjusted. By setting the abutting member to an abutting state, rotation of the pan-purpose rotating table 80 is disabled, and the rotation angle of the camera body 10 in the pan direction can be fixed at a desired angle.

The tilt-purpose rotating table 82 is formed of a rectangular plate-shaped bottom plate part 96, two plate-shaped swing arm parts 98 and 100 provided to stand from two end parts serving as opposite sides of the bottom plate part 96 toward the front side, and the pedestal part 102 (refer to FIG. 2) selling in a rectangular shape from the center toward the front side of the bottom plate part 96.

The bottom plate part 96 is formed to have a width so as to be insertable between the two support parts 92 and 94 of the pan-purpose rotating table 80. Also, to the pedestal part 102, the holder 62 of the imaging unit 22 of the camera body 10 is fixed, and the camera body 10 is supported by the tilt-purpose rotating table 82.

The two swing arm parts 98 and 100 are placed to face each other at locations so as to be symmetrical with respect to the center axis of the bottom plate part 96, and are also inserted and placed between the two support parts 92 and 94 of the pan-purpose rotating table 80.

In these swing arm parts 98 and 100, tilt shaft holes 98a and 100a are formed, into which the tilt shaft members 84 and 86, respectively, are inserted. The tilt shaft members 84 and 86 inserted into the tilt shaft holes 92a and 94a formed in the support pars 92 and 92 of the pan-purpose rotating table 80 are inserted into the tilt shaft holes 98a and 100a of the swing arm parts 98 and 100, respectively. With this, the tilt-purpose rotating table 82 takes the center axes of the tilt shaft members 84 and 86 as the tilt axis t1 with respect to the pan-purpose rotating table 80, and is rotatably supported about the tilt axis t1.

According to the tilt mechanism including the tilt-purpose rotating table 82, when the tilt-purpose rotating table 82 rotates about the tilt axis t1, the camera body 10 supported by the tilt-purpose rotating table 82 rotates in a tilt direction about the tilt axis t1.

Figure 13C:
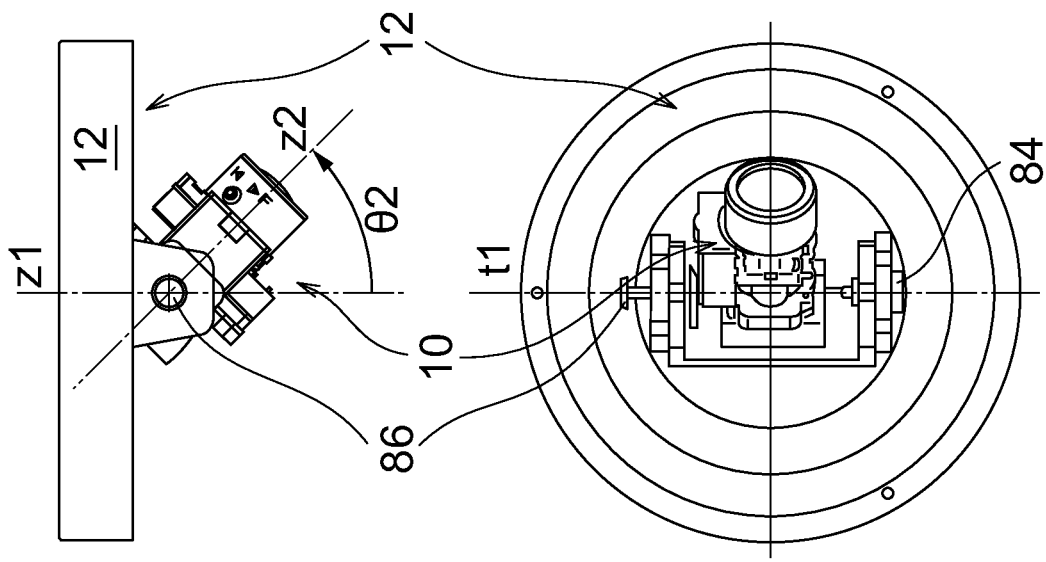
FIGS. 13A to C are diagrams for describing cases set with different tilt angles of the camera body.
Figure 13B:
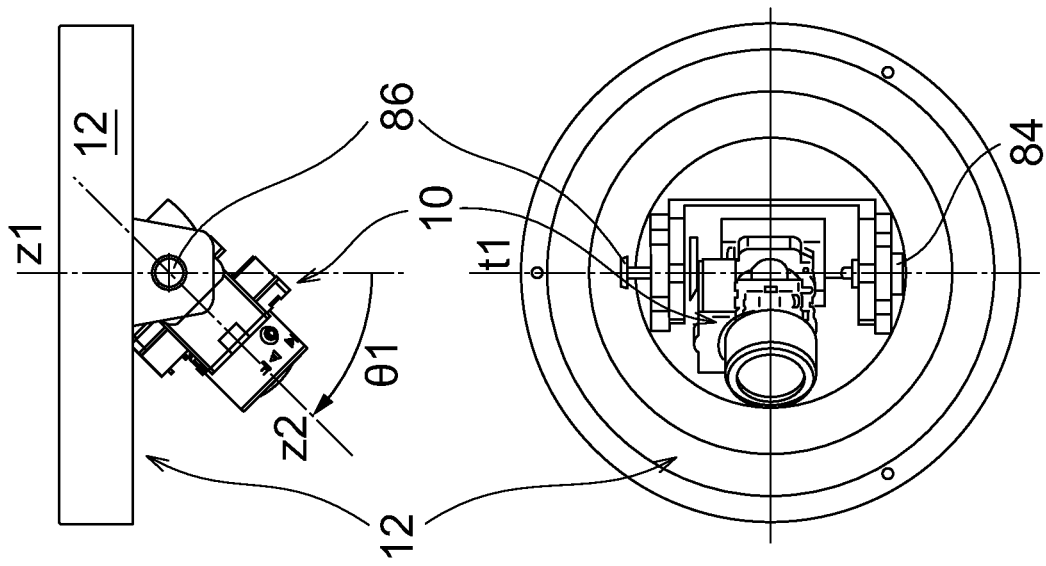
Figure 13A:
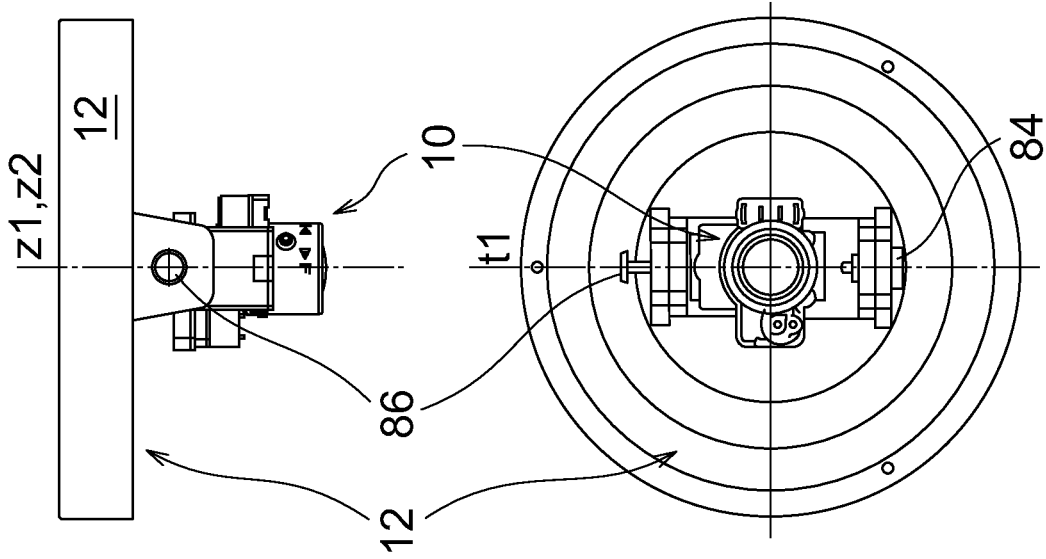

That is, with the cover part 14 removed from the base part 12, by the operator gripping the camera body 10 and adding a rotating force in the tilt direction to the camera body 10, the tilt-purpose rotating table 82 rotates in the direction of the rotating force to rotate the camera body 10 in the tilt direction, as depicted in FIGS. 13A to 13C. Therefore, as the orientation of the camera body 10, the rotation angle in the tilt direction (tilt angle) can be adjusted.

Here, FIGS. 13A to 13C depict the camera body 10 and the base part 12 with the cover part 14 removed from the dome-shaped camera 1, depicting the cases set with different tilt angles of the camera body 10. Also, a plan view is depicted on an upper stage side of each of these drawings, and a front view is depicted on a lower stage side thereof in the state corresponding to the upper stage side.

FIG. 13A depicts the state in which the orientation of the camera body 10 is set at a tilt angle of 0 degree, where the optical axis z2 of the camera body 10 and the center axis z1 of the base part 12 are coaxial with each other, like the states of FIG. 1 to FIG. 5. By contrast, when the camera body 10 is rotated by the above-described tilt mechanism in the tilt direction, as depicted in FIGS. 13B and 13C, the orientation of the camera body 10 can be set in the states of tilt angles of θ1 and θ2 (here, each tilt angle is an angle of intersection of the optical axis z2 and the center axis z1), respectively, where the optical axis z2 of the camera body 10 is oriented in a direction different from the center axis z1 of the base part 12.

Also, as depicted in FIG. 5, a screw member (bolt) 106 is used as the tilt shaft member 84, which is one of the tilt shaft members 84 and 86. In a shaft part 106a of the screw member 106 inserted into the tilt shaft holes 92a and 98a, a thread groove is formed. At a base end part of the shaft part 106a serving as the outside of the support part 92 of the pan-purpose rotating table 80, a head part 106b with its diameter increased more than that of the shaft part 106a is formed. At a tip side of the shaft part 106a serving as the inside of the swing arm part 98 of the tilt-purpose rotating table 82, a screwing member (nut) 107 fixed to the inner surface of the swing arm part 98 is screwed.

According to this, by rotating the screw member 106 in a non-screwing direction opposite to a screwing direction to expand a space between the head part 106b and the screwing member 107, rotation of the tilt-purpose rotating table 82 can be enabled to adjust the tilt angle of the camera body 10. On the other hand, by rotating the screw member 106 in the screwing direction to narrow the space between the head part 106b and the screwing member 107 to compress the support part 92 of the pan-purpose rotating table 80 and the swing arm part 98 of the tilt-purpose rotating table 82 by the head part 106b and the screwing member 107, rotation of the tilt-purpose rotating table 82 can be disabled to fix the tilt angle of the camera body 10 at a predetermined angle.

Note that a second power transmission member 202 of the cover-interlocked-type focus adjustment mechanism, which will be described further below in detail, is used as the other tilt shaft member 86 of the tilt shaft members 84 and 86, and this will be described further below.

Next, the cover part 14 depicted in FIG. 1 to FIG. 4 is described.

The cover part 14 is configured of, as depicted in FIG. 5, the dome cover 16 which covers the camera body 10, a cover fixing ring 110 for removably mounting the cover part 14 on the base part 12, a cover rotation fixing ring 112 which disables rotation of the dome cover 16, a first power transmission member 200, which is a component part of the cover-interlocked-type focus adjustment mechanism, and so on.

Figure 7:
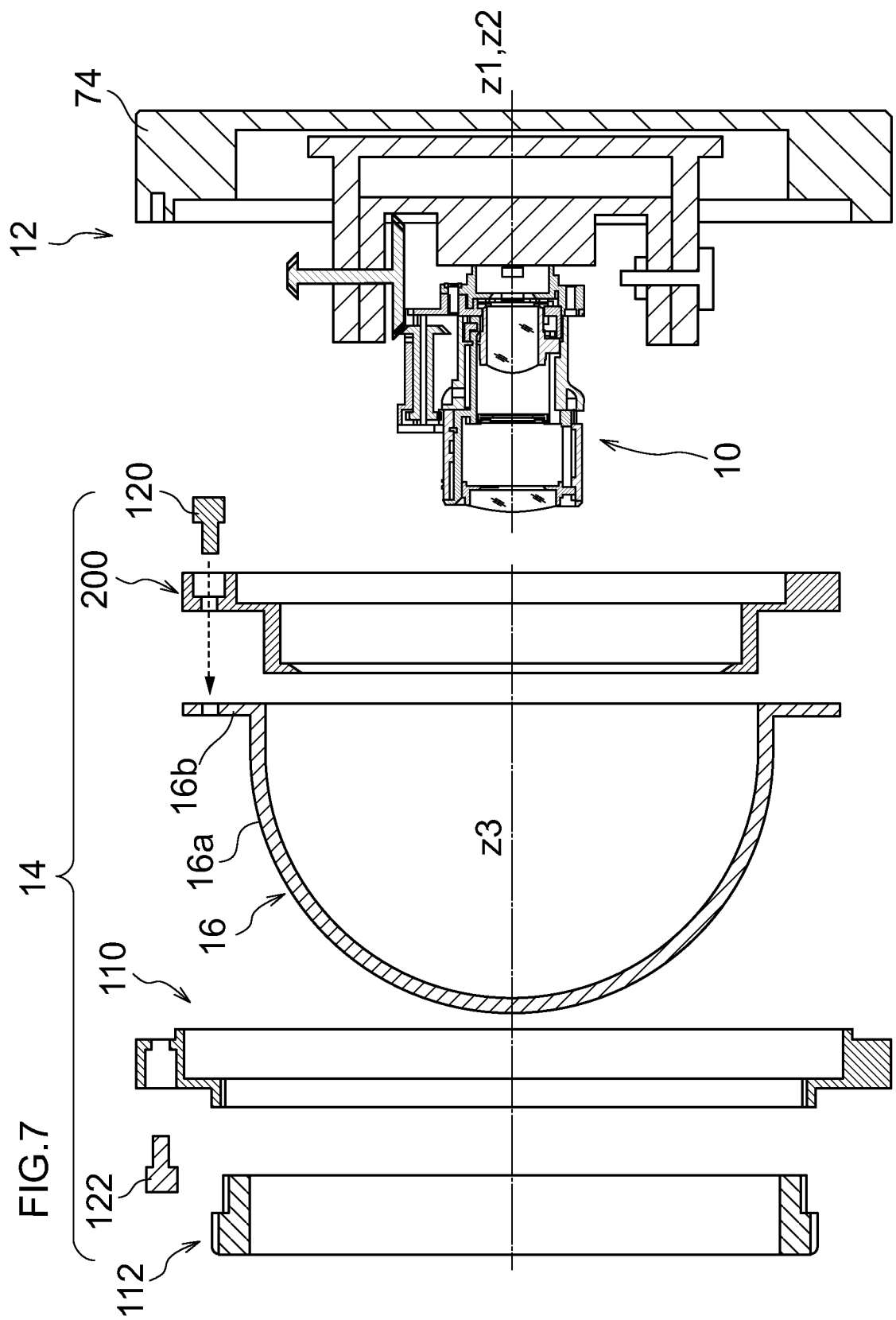
FIG. 7 is a sectional view of the cover part FIG. 5 removed from the base part and disassembled.

While details of each component part of the cover part 14 will be described further below, the dome cover 16, the cover fixing ring 110, the cover rotation fixing ring 112, and the first power transmission member 200 configuring the cover part 14 can be disassembled as depicted in FIG. 7.

Figure 8:
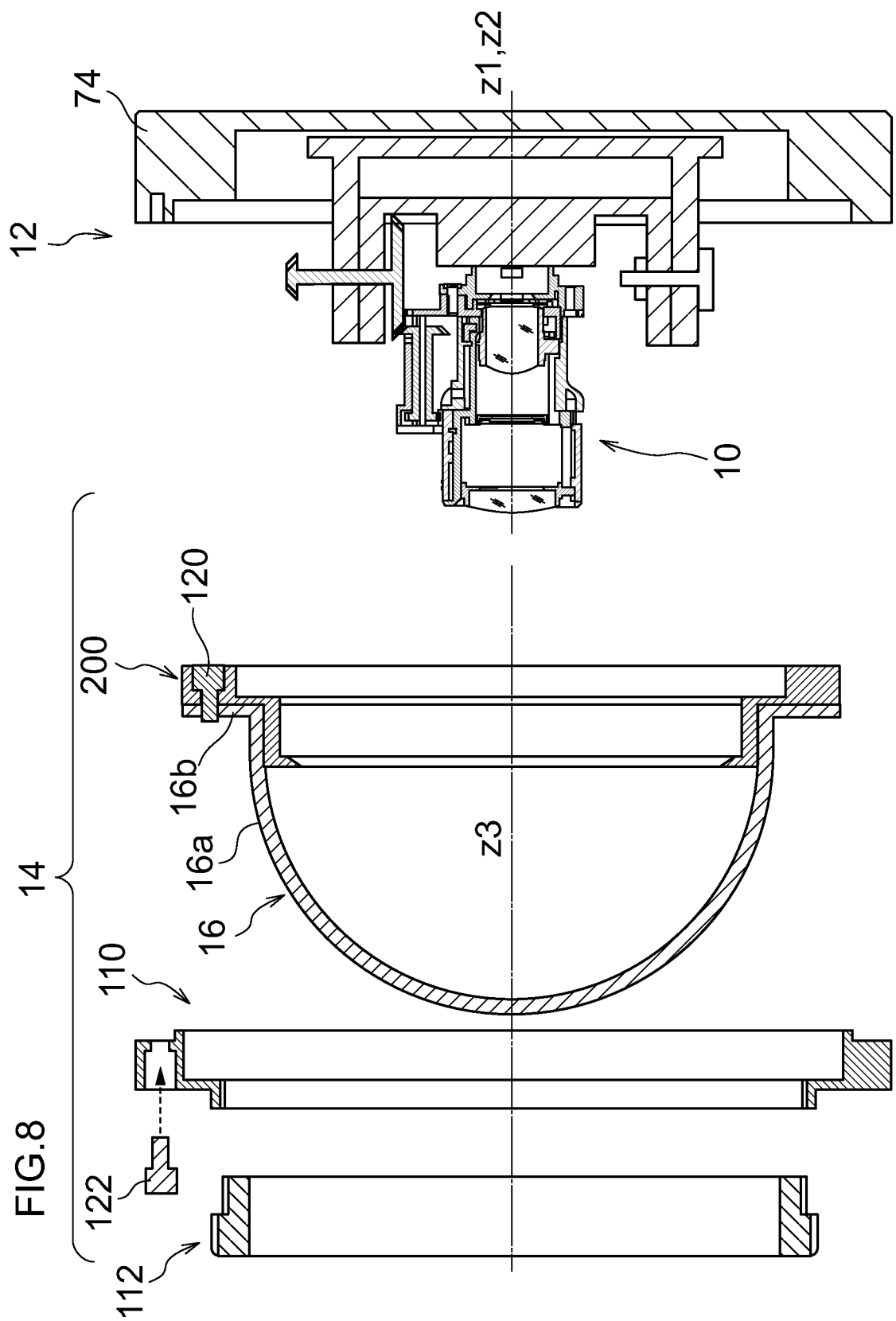
FIG. 8 is a sectional view of the state in which a first power transmission member is fixed to the dome cover in FIG. 7.
Figure 9:
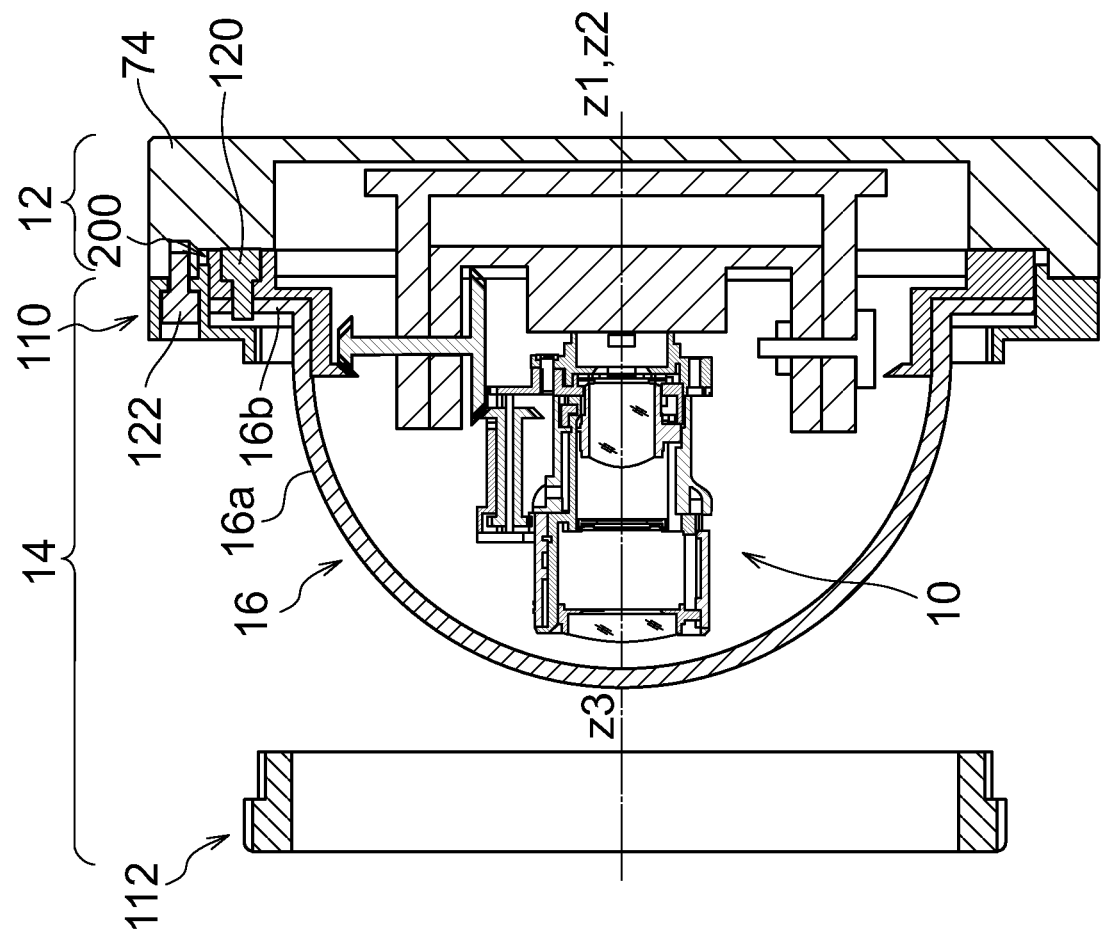
FIG. 9 is a sectional view of the state in which the dome cover, the first power transmission member, and a cover fixing ring are mounted on the base part.

When the cover part 14 is mounted on the base part 12, first as depicted in FIG. 8, the first power transmission member 200 is fixed with a screw 120 (and other screws not depicted in the drawing at several locations) to a rear surface side of a circumferential edge part (a flange part 16b, which will be described further below) of the dome cover 16. With this, the center axis of the first power transmission member 200 is placed coaxially with the center axis z3 of the dome cover 16. Then, as depicted in FIG. 9, the cover fixing ring 110 is superposed on the circumferential edge part of the dome cover 16 from its front side, and the cover fixing ring 110 is fixed to the peripheral wall part 74 of the base part 12 with screws 122 (three screws 122 also depicted in FIG. 2 and FIG. 5) at three locations.

With this, the circumferential edge parts of the dome cover 16 and the first power transmission member 200 are interposed in a gap part between the cover fixing ring 110 and the peripheral wall part 74 of the base part 12, and the dome cover 16 and the first power transmission member 200 are mounted on the base part 12, with their movement to a direction of the center axis z3 and to a direction orthogonal to the center axis z3 regulated. Also, the center axis z3 and the center axis z1 of the base part 12, which is also the pan axis, are placed coaxially with each other.

Figure 10:
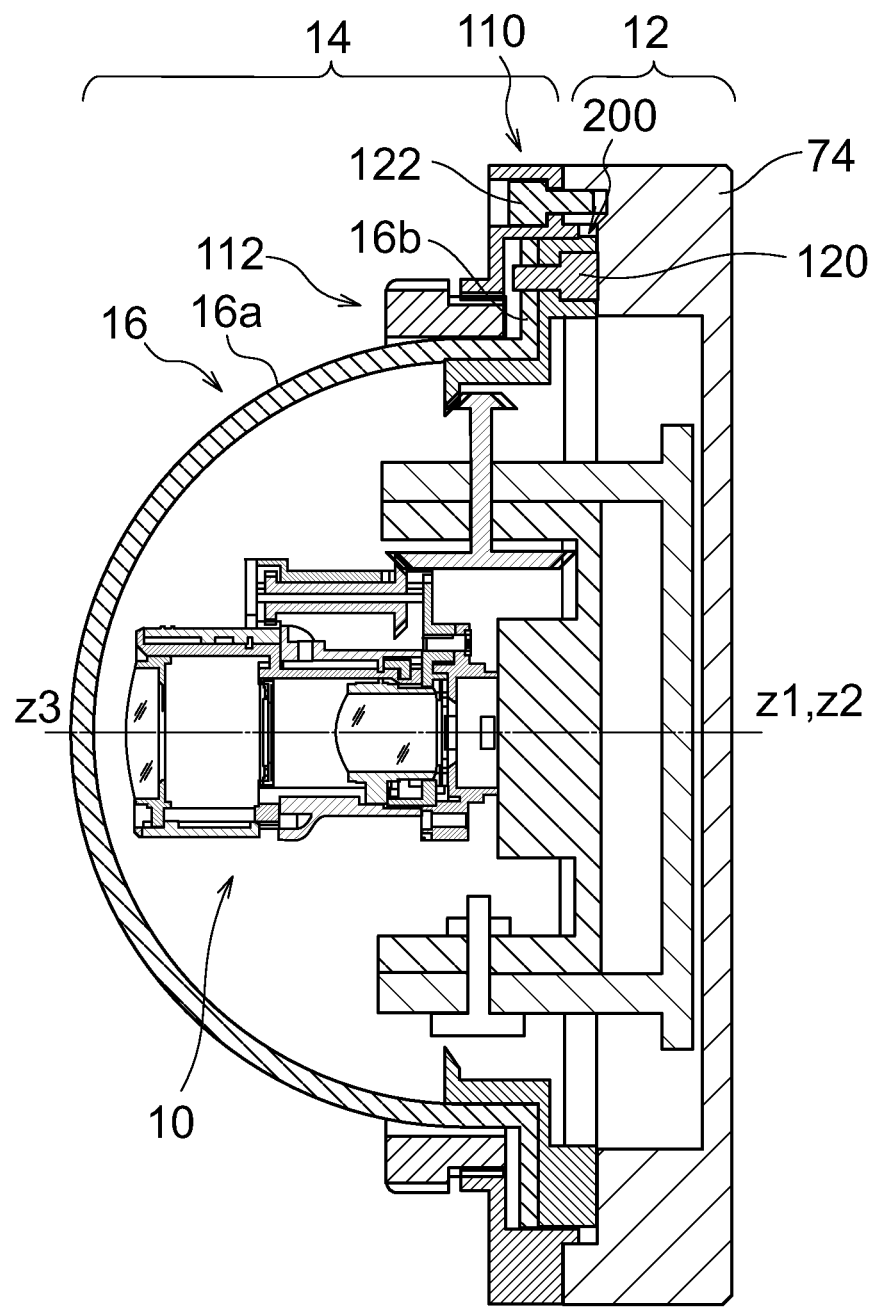
FIG. 10 is a sectional view of the state in which a cover rotation fixing ring is mounted on the cover fixing ring.

Next as depicted in FIG. 10, the cover rotation fixing ring 112 is screwed into the inner circumferential surface of the cover fixing ring 110 from the front to be mounted on the cover fixing ring 110. However, the cover rotation fixing ring 112 may be mounted on the cover fixing ring 110 before the cover fixing ring 110 is fixed to the peripheral wall part 74 of the base part 12. As such, the cover part 14 is mounted on the base part 12.

Here, with the cover rotation fixing ring 112 mounted on the cover fixing ring 110, when the cover rotation fixing ring 112 is rotated in the screwing direction, the rear end face of the cover rotation fixing ring 112 abuts on the front surface of the circumferential edge part (flange part 16b) of the dome cover 16 as depicted in FIG. 5 to cause the circumferential edge parts of the dome cover 16 and the first power transmission member 200 to be pressed onto the front surface of the peripheral wall part 74 of the base part 12, thereby causing the state in which rotation of the dome cover 16 (and the first power transmission member 200) about the center axis z3 is regulated (rotation is disabled).

In contrast to this state, in the state in which the cover rotation fixing ring 112 is rotated in the non-screwing direction to decrease its pressing force, for example, the state in which the rear end face of the cover rotation fixing ring 112 is spaced away from the front surface of the circumferential edge part of the dome cover 16 as in FIG. 10 or the state in which the cover rotation fixing ring 112 is not mounted on the cover fixing ring 110 as in FIG. 9, rotation of the dome cover 16 (and the first power transmission member 200) about the center axis z3 is enabled.

As such, when a rotating operation is performed on the dome cover 16 with rotation of the dome cover 16 enabled, the focus adjustment ring 38 provided to the lens barrel 20 of the camera body 10 rotates by the power transmitting device including the first power transmission member 200 of the cover-interlocked-type focus adjustment mechanism, which will be described further below. Therefore, even with the dome cover 16 mounted on the base part 12, focus adjustment can be manually performed, and a deviation of the focus position due to mounting of the dome cover 16 can be corrected.

Then, after focus adjustment is performed by the rotating operation on the dome cover 16, the cover rotation fixing ring 112 is screwed into the cover fixing ring 110, and the circumferential edge parts of the dome cover 16 and the first power transmission member 200 are pressed onto the front surface of the peripheral wall part 74 of the base part 12 as described above. Thus, rotation of the dome cover 16 of the first power transmission member 200 about the center axis z3 can be regulated, and the focus position can be fixed. With this, the situation in which the focus position is deviated due to a shock, vibration, or the like can be prevented in advance Subsequently, each component part of the cover part 14 is described in detail by using an enlarged sectional view of FIG. 11 depicting a mount portion between the cover part 14 and the base part 12 depicted in an upper part of FIG. 5.

Figure 11:
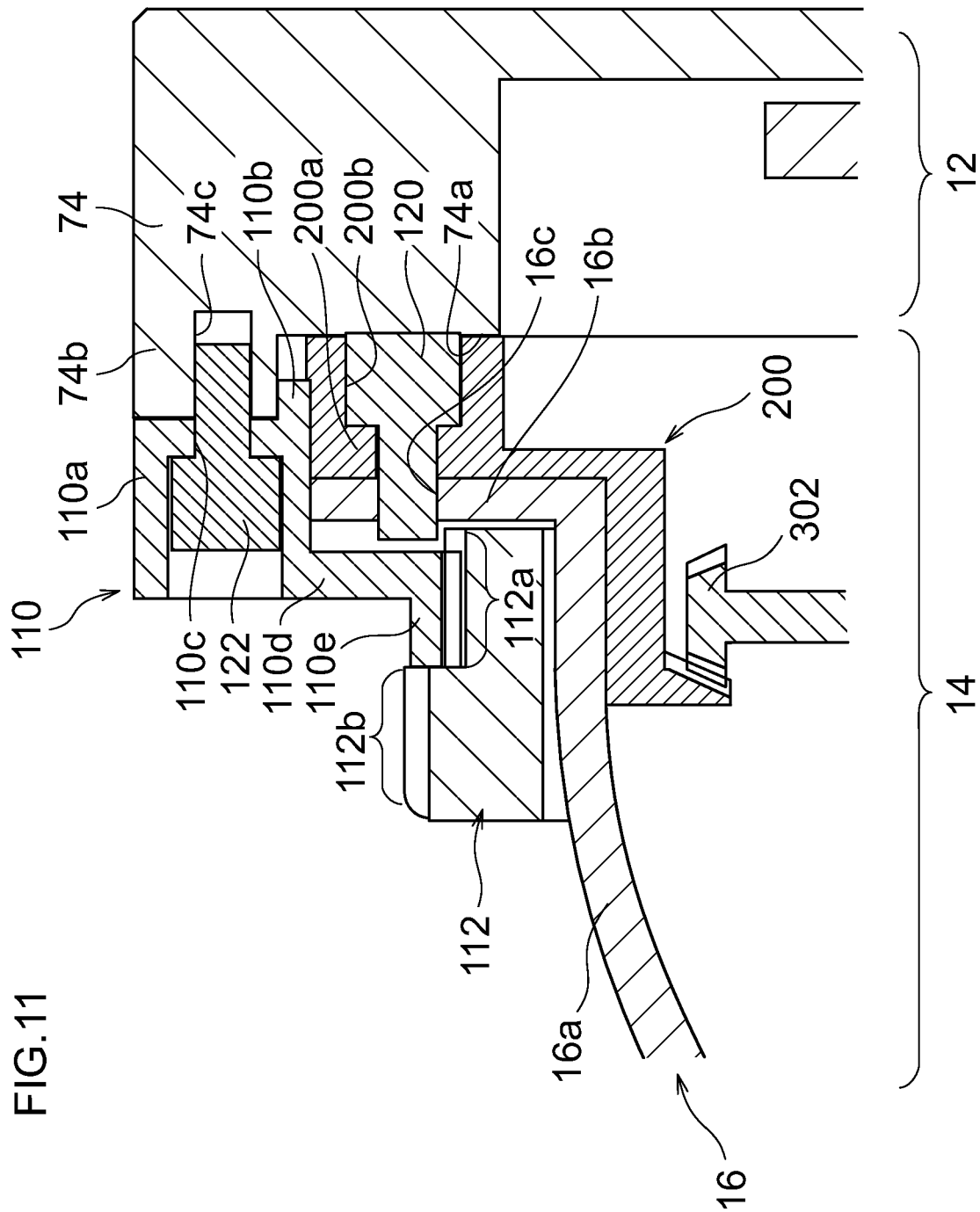
FIG. 11 is an enlarged sectional view of a mount portion between the cover part and the base part

The dome cover 16 partially depicted in FIG. 11 is formed of a light-transmission member so that the camera body 10 can image an outside subject via the dome cover 16, and is configured of a hemispherically-shaped dome part 16a and the flange part 16b (the peripheral edge part of the dome cover 16) provided to extend in an annular shape from the rear end part of the dome part 16a toward the outside, as the entirety is depicted in FIG. 7.

On the flange part 16b, the first power transmission member 200 is mounted on the rear surface side. In the flange part 16b, screw holes 16c are formed at, for example, three locations, spaced equidistantly in a circumferential direction, and screw insertion holes 200b into which screws are inserted are formed at three locations of an outer ring part 200a of the first power transmission member 200 having a positional relation equivalent to that of these screw holes 16c. And, the screws 120 are inserted into the screw insertion holes 200b to be screwed into the screw holes 16c of the flange part 16b. With this, with the center axis of the first power transmission member 200 and the center axis z3 of the flange part 16 coaxial with each other, the first power transmission member 200 is fixed to the rear surface side of the flange part 16b. Note that the structure of the first power transmission member 200 will be described further below.

Outside of the outer circumferential end face of the flange part 16b, a ring body 110a of the cover fixing ring 110 is placed. The ring body 110a has a section formed in a substantially rectangular shape, and its outer circumferential surface formed in a cylindrical-surface-shape with a radius substantially matching the radius of the outer circumferential surface of the peripheral wall part 74 of the base part 12.

On an inner outer-edge part on the rear surface side of the ring body 110a, a projecting part 110b in an annular shape projecting rearward is formed. On the other hand, a projecting part 74b swelling in an annular shape is formed on the outer outer-edge part on a front surface part of the peripheral wall part 74 of the base part 12, and the projecting part 110b formed on the ring body 110a fits inside the projecting part 74b of the peripheral wall part 74. With this, the cover fixing ring 110 is positioned at a location where its center axis and the center axis z1 of the base part 12 are coaxial with each other.

Also, the inner circumferential surface of the ring body 110a is formed so as to have a diameter substantially equal to that of the outer circumferential end face of the flange part 16b of the dome cover 16, and the center axis of the cover fixing ring 110 and the center axis z3 of the dome cover 16 are placed at locations so as to be substantially coaxial with each other. Therefore, together with the cover fixing ring 110, the dome cover 16 and the first power transmission member 200 are also positioned at locations where the center axis z3 is substantially coaxial with the center axis z1 of the base part 12.

In the projecting part 74b of the peripheral wall part 74 of the base part 12, screw holes 74c, 74c, 74c are formed at three locations spaced equidistantly in a circumferential direction. At three locations of the ring body 110a having a positional relation equivalent to these screw holes 74c, 74c, 74c, screw insertion holes 110c, 110c, 110c are formed, into which the screws are inserted. And, with the screws 122, 122, 122 inserted into the screw insertion holes 110c, 110c, 110c of the ring body 110a to be screwed into the screw holes 74c, 74c, 74c of the base part 12, the cover fixing ring 110 is fixed so as not to be disengaged from the base part 12.

On a front end side of the inner circumferential surface of the ring body 110a, an engaging part 110d projecting inwardly in an annular shape is formed. In a gap part between that engaging part 110d and the front surface of the peripheral wall part 74 of the base part 12, the flange part 16b of the dome cover 16 and the outer ring part 200a of the first power transmission member 200 are inserted. With this, the movement range of the dome cover 16 and the first power transmission member 200 to a center axis z3 direction is regulated. Also, the dome cover 16 and the first power transmission member 200 are mounted on the base part 12 as prevented from slipping forward from the center opening of the cover fixing ring 110.

On an inner circumferential edge part of the engaging part 110d, a screw forming part 110e projecting frontward in an annular shape is formed. In the inner circumferential surface of the screw forming part 110e, a thread groove is formed. In the thread groove, a screw part 112a of the cover rotation fixing ring 112 is screwed.

The cover rotation fixing ring 112 is formed in a cylindrical shape, and has the screw part 112 with a thread groove formed on the rear side of its outer circumferential surface and has an operating part 112b subjected to a knurling process on the front side (refer to FIG. 2). And, the screw part 112a is screwed in the thread groove formed in the inner circumferential surface of the screw forming part 110e of the cover rotation fixing ring 112.

With this, by using the operating part 112b to perform a rotating operation on the cover rotation fixing ring 112, the cover rotation fixing ring 112 moves in a forward-backward direction (a direction of the center axis z3).

Therefore, by rotating the cover rotation fixing ring 112 in a screwing direction to cause the rear end face of the cover rotation fixing ring 112 to abut on the front surface of the flange part 16b of the dome cover 16 and to press the flange part 16b of the dome cover 16 and the outer ring part 200a of the first power transmission member 200 toward a front surface 74a of the peripheral wall part 74 of the base part 12 (an inner front surface of the projecting part 74b) (that is, by fastening the cover rotation fixing ring 112), the dome cover 16 and the first power transmission member 200 can be fixed with their rotation about the center axis z3 disabled.

On the contrary, by rotating the cover rotation fixing ring 112 in a non-screwing direction to decrease the pressing force by the cover rotation fixing ring 112 toward the flange part 16b of the dome cover 16 and the outer ring part 200a of the first power transmission member 200 as in FIG. 10 (that is, by loosening the cover rotation fixing ring 112), rotation of the dome cover 16 and the first power transmission member 200 about the center axis z3 can be enabled. Here, by performing a rotating operation on the dome cover 16 as described above, focus adjustment can be performed by the cover-interlocked-type focus adjustment mechanism.

Note that, as in FIG. 10, when the cover rotation fixing ring 112 is loosened to such an extent that the dome cover 16 and the first power transmission member 200 rattle in the forward-backward direction, coupling of the first power transmission member 200 and the second power transmission member 202, which will be described further below, as components of the cover-interlocked-type focus adjustment mechanism is released, and there is a possibility that focus adjustment cannot be performed even with a rotating operation on the dome cover 16.

Since the first power transmission member 200 and the second power transmission member 202 are designed so as to be appropriately coupled together when the rear surface of the outer ring part 200a of the first power transmission member 200 is caused to abut on the front surface 74a of the peripheral wall part 74 of the base part 12, it is preferable if a corrugated spring in an annular shape is inserted into a gap part between the rear surface of the engaging part 110d of the cover fixing ring 110 and front surface of the flange part 16b of the dome cover 16 to press the dome cover 16 and the first power transmission member 200 rearward to cause the rear surface of the outer ring part 200a of the first power transmission member 200 to abut on the front surface 74a of the peripheral wall part 74 of the base part 12. An operation similar to the above may be obtained by a pressing device other than the corrugated spring.

However, such a pressing device is not necessarily required to be provided. For example, if a rotating operation is performed on the dome cover 16 as being pressed onto a base part 12 side or if the cover rotation fixing ring 112 is loosened to such an extent that the dome cover 16 and the first power transmission member 200 do not rattle in the forward-backward direction and the dome cover 16 is rotatable, the dome cover 16 can be rotated as the state in which the first power transmission member 200 and the second power transmission member 202 are coupled together is kept. Therefore, this may be taken as an attention matter in operation.

Also, the mount device for mounting the dome cover 16 on the base part 12 so as to be rotatable about the center axis z3 (z1) is not restricted to the structure of the cover fixing ring 110 of the above embodiment, and another structure may be used. For example, in the above embodiment, when the cover fixing ring 110 is mounted on the peripheral wall part 74 of the base part 12 with the screws 122, the circumferential edge parts of the dome cover 16 and the first power transmission member 200 are interposed between the peripheral wall part 74 of the cover fixing ring 110 so that rotation is disabled. Then, by loosening the screws 122, the dome cover 16 and the first power transmission member 200 may become in the state of being rotatably mounted. In this case, the cover rotation fixing ring 112 is not required.

Furthermore, a device for mounting the cover fixing ring 110 on the base part 12 may be one not using the screws 120 as described above. Also, as a regulating device for regulating rotation of the dome cover 16, a device other than the above-described cover rotation fixing ring 112 may be used. For example, a screw hole may be provided in the cover fixing ring 110, and the tip of a screw screwed into the screw hole may be caused to abut on the flange part 16b of the dome cover 16 to regulate rotation of the dome cover 16.

Next, the cover-interlocked-type focus adjustment mechanism is described in which, with the cover part 14 (dome cover 16) mounted on the base part 12 as described above, a rotating operation is manually performed on the dome cover 16 about the center axis z3 to allow focus adjustment.

The cover-interlocked-type focus adjustment mechanism includes, as depicted in FIG. 5, a power transmitting device including, as rotatably-provided rotating members, the first power transmission member 200 fixed to the dome cover 16, the second power transmission member 202 which operates as a tilt shaft member 86 inserted into tilt shaft holes 94a and 100a of the pan-purpose rotating table 80 and the tilt-purpose rotating table 82 of the base part 12, and a third power transmission member 204 of the gearwheel support part 210 set on a side part of the lens barrel 20.

As will be described further below in detail, the second power transmission member 202 and the third power transmission member 204 are coupled together in a power transmittable manner, and the third power transmission member 204 and the focus adjustment ring 38 of the lens barrel 20 are coupled together in a power transmittable manner, irrespective of whether the cover part 14 is mounted on the base part 12. With the cover part 14 mounted on the base part 12, the first power transmission member 200 and the second power transmission member 202 are coupled together in a power transmittable manner.

Therefore, when a rotating operation is manually performed on the dome cover 16 with the cover part 14 mounted on the base part 12 and with the cover rotation fixing ring 112 loosened, the first power transmission member 200 fixed to the dome cover 16 rotates in an interlocked manner, and its power is transmitted as a rotating force of the focus adjustment ring 38 via the second power transmission member 202 and the third power transmission member 204 in this sequence. Then, the focus adjustment ring 28 rotates. With this, focus adjustment can be performed by the rotating operation on the dome cover 16.

Figure 12:
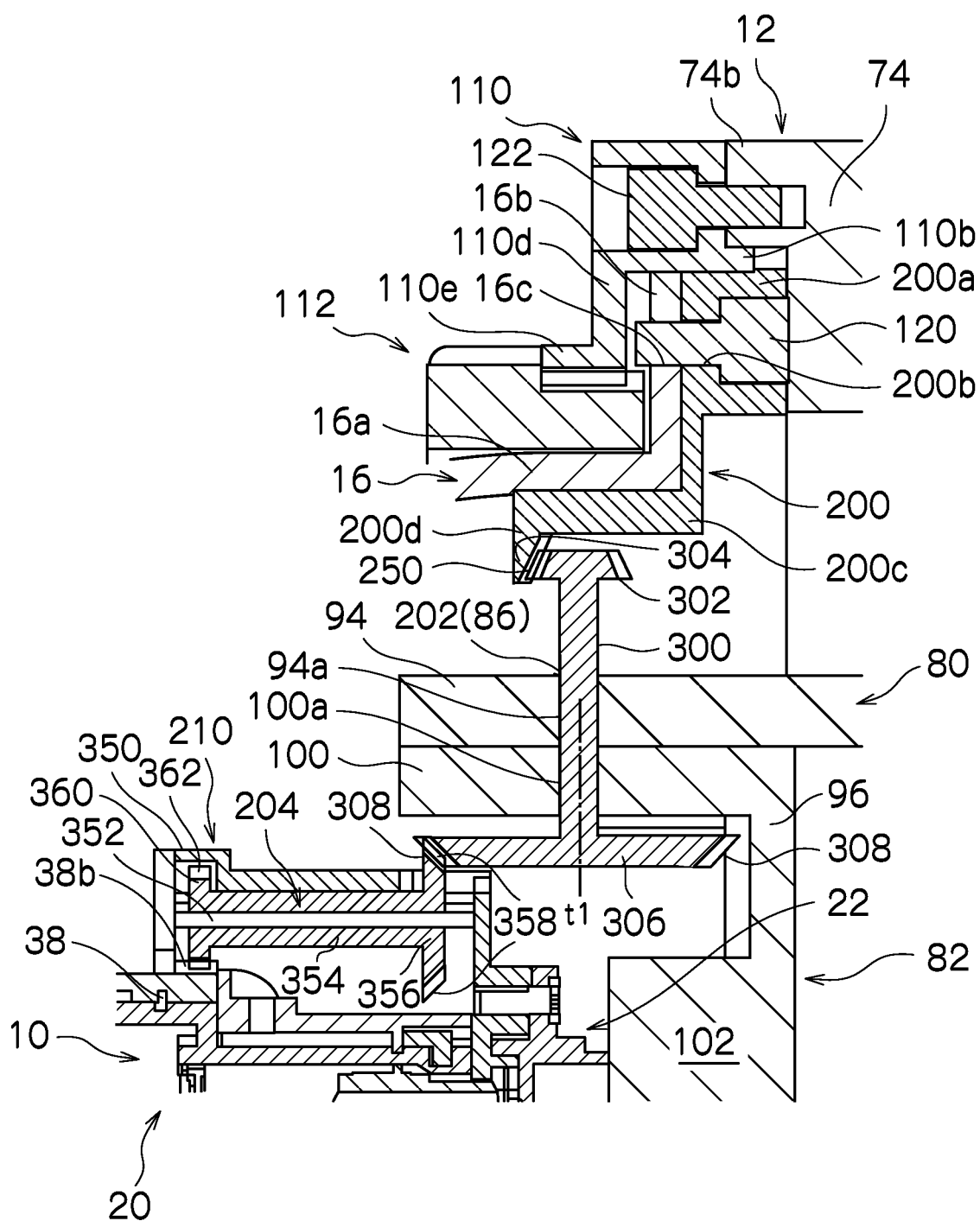
FIG. 12 is an enlarged sectional view of component portions of a cover-interlocked-type focus adjustment mechanism in FIG. 5.

The structure of the cover-interlocked-type focus adjustment mechanism is described in detail by using an enlarged sectional view of FIG. 12 depicting component portions of the cover-interlocked-type focus adjustment mechanism in FIG. 5 with the cover part 14 mounted on the base part 12.

The first power transmission member 200 has the outer ring part 200a fixed to the flange part 16b of the dome cover 16 with the screws 120 as described above. The outer ring part 200a is formed so as to have a rectangular section.

From a circumferential edge part on the front side of the inner circumferential surface of the outer ring part 200a, a coupling part 200c extends, which has a shape along the rear surface of the flange part 16b of the dome cover 16 and the inner surface near the rear end of the dome part 16a. And, at a front end part of the coupling part 200c, a gearwheel forming part 200d receiving inside and projecting in an annular shape is formed. On the inner circumferential end face of the gearwheel forming part 200d, a first gear (bevel gearwheel) 250 in a cone shape is formed. Therefore, the first gear 250 in a circumferential shape is placed along the rear end part of the dome cover 16 (rear end part of the dome part 16a). The first gear (bevel gearwheel) 250 is engaged with a second gear (bevel gearwheel) 304 of the second power transmission member 202, with the cover part 14 mounted on the base part 12.

The second power transmission member 202 includes a shaft part 300 in a columnar shape operating as the above-described tilt shaft member 86 and forming the tilt axis t1. The shaft part 300 is rotatably supported as being inserted into the tilt shaft hole 94a formed in the support part 94 of the pan-purpose rotating table 80 and the tilt shaft hole 100a formed in the swing arm part 100 of the tilt-purpose rotating table 82. Note that a bearing member (bearing) which rotatably supports the shaft part 300 of the second power transmission member 202 in the tilt shaft hole 94a and the tilt shaft hole 100a may be provided.

At an outer end part of the shaft part 300 outside from the support part 94 of the pan-purpose rotating table 80, an outer gearwheel forming part 302 in a disk shape with a diameter increased more than that of the shaft part 300 is provided. On an outer circumferential end face of the outer gearwheel forming part 302, a second gear (bevel gearwheel) 304 in a cone shape is formed. The second gear 304 is engaged with the first gear (bevel gearwheel) 250 of the first power transmission member 200, with the cover part 14 mounted on the base part 12 as described above.

As such, by coupling the first gear 250 of the first power transmission member 200 and the second gear 304 of the second power transmission member 202 together as bevel gearwheels, the power of the first power transmission member 200 rotating by taking the center axis z1 (pan axis) of the base part 12 coaxial with the center axis z3 of the dome cover 16 as a rotation axis can be transmitted to the second power transmission member 202 which takes the tilt axis t1 orthogonal to the center axis z1 of the base part 12 as a rotation axis.

On the other hand, at an inner end part of the shaft part 300 inside from the swing arm part 100 of the tilt-purpose rotating table 82, an inner gearwheel forming part 306 in a disk shape with a diameter increased more than that of the shaft part 300 is provided. On an outer circumferential end face of the inner gearwheel forming part 306, a third gear (bevel gearwheel) 308 in a cone shape is formed. The third gear 308 is engaged with a fourth gear (bevel gearwheel) 358 of the third power transmission member 204.

Note that at least one of the outer gearwheel forming part 302 and the inner gearwheel forming part 306 of the second power transmission member 202 is fixedly attached to the shaft part 300 after the shaft part 300 is inserted and deployed in the tilt shaft holes 94a and the 100a.

The gearwheel support part 210 placed on the side part of the lens barrel 20 includes a frame body 350 supported by one or both of the fixing pipe 30 of the lens barrel 20 and the holder 62 of the imaging unit 22, and a rotating shaft 352 parallel to the optical axis z2 is rotatably and axially supported by the frame body 350. On the rotating shaft 352, the third power transmission member 204 is fixedly provided, and the third power transmission member 204 is supported so as to be rotatable with the rotating shaft 352.

The third power transmission member 204 includes a columnar-shaped shaft part 354 having a through hole into which the rotating shaft 352 is inserted. At a rear end part of the shaft part 354, a rear-side gearwheel forming part 356 in a disk shape with a diameter increased more than that of the shaft part 354 is provided. On an outer circumferential end face of the rear-side gearwheel forming part 356, the fourth gear (bevel gearwheel) 358 in a cone shape is formed. The fourth gear 358 is engaged with the third gear (bevel gearwheel) 308 of the second power transmission member 202.

As such, by coupling the third gear 308 of the second power transmission member 202 and the fourth gear 358 of the third power transmission member 204 together as bevel gears, the power of the second power transmission member 202 rotating by taking the tilt axis t1 as a rotation axis can be transmitted as a rotating force of the third power transmission member 204 which takes an axis parallel to the optical axis z3 orthogonal to the tilt axis t1 as a rotation axis.

On the other hand, at a front end part of the shaft part 354 of the third power transmission member 204, a front-side gearwheel forming part 360 in a disk shape with a diameter increased more than that of the shaft part 354 is provided. On an outer circumferential end face of the front-side gearwheel forming part 360, a fifth gear (spur gearwheel) 362 is formed. The fifth gear 362 is engaged with a sixth gear (spur gearwheel) 38b formed on the outer circumferential surface of the focus adjustment ring 38 of the lens barrel 20. With this, when the third power transmission member 204 rotates, the focus adjustment ring 38 rotates to change the focus position.

According to the cover-interlocked-type focus adjustment mechanism including the above-described power transmitting device, when a rotating operation is performed on the dome cover 16 with the cover part 14 mounted on the base part 12, the first power transmission member 200 rotates in an interlocked manner, and its power causes the second power transmission member 202 to rotate. Then, when the second power transmission member rotates, its power causes the third power transmission member 204 to rotate. When the third power transmission member 204 rotates, its power causes the focus adjustment ring 38 of the lens barrel 20 to rotate. Therefore, focus adjustment can be performed by manually performing a rotating operation on the dome cover 16 after mounting the dome cover 16 on the base part 12.

And, according to the cover-interlocked-type focus adjustment mechanism, when the dome-type camera 1 is set or the like, with the cover part 14 (the dome cover 16) removed from the base part 12, a rotating operation is directly and manually performed on the focus adjustment ring 38 of the lens barrel 20 for focus adjustment. Then, when the cover part 14 is mounted on the base part 12, a deviation of the focus position occurring due to the influence of the dome cover 16 can be corrected by manually performing a rotating operation on the dome cover 16.

Also, with the influence of the dome cover 16 included after the dome cover 16 is mounted on the base part 12, if focus adjustment is performed so that the subject at a desired position is accurately in focus, the need for focus adjustment itself with the dome cover 16 removed from the base part 12 and also the need for accurate focus adjustment can be eliminated.

Furthermore, as described above, since the shaft part 300 of the second power transmission member 202 is placed at the location of the tilt axis t1 as the tilt shaft member 86, when the camera body 10 is changed at any rotation angle in the tilt direction, the third power transmission member 204 rotates about the shaft part 300 by taking the shaft part 300 of the second power transmission member 202 as a rotation axis. Thus, even in the state in which the tilt angle of the camera body 10 is set at any angle, the state in which the third gear 308 of the second power transmission member 202 and the fourth gear 358 of the third power transmission member 204 are coupled together can be kept, and the power of the second power transmission member 202 can be transmitted to the third power transmission member 204. Therefore, irrespective of the tilt angle of the camera body 10, focus adjustment can be performed by a rotating operation on the dome cover 16.

Still further, when the rotation angle of the camera body 10 in the pan direction is changed, the location of the second power transmission member 202 is displaced to a rotating location of the base part 12 about the center axis z1 as a pan axis. However, since the first gear 250 of the first power transmission member 200 is placed over the entire circumference about the center axis z1 (pan axis) of the base part 12 as described above, the state in which the first gear 250 of the first power transmission member 200 and the second gear 304 of the second power transmission member 202 can be kept irrespective of the rotation angle (pan angle) in the pan direction set for the camera body 10, and the power of the first power transmission member 200 can be transmitted to the second power transmission member 202. Therefore, irrespective of the pan angle of the camera body 10, focus adjustment can be performed by a rotating operation on the dome cover 16.

That is, according to the above-described cover-interlocked-type focus adjustment mechanism, focus adjustment can be performed by a rotating operation on the dome cover irrespective of the orientation of the camera body 10.

In the foregoing, the mode using a varifocal lens as the lens barrel 20 of the camera body 10 has been described in the above embodiment. The present invention can be applied to even a lens barrel of the structure other than the varifocal lens as long as the lens barrel is a fixed-focus lens or the like including a focus adjustment ring for manually performing focus adjustment.

Also, in the above embodiment, the rotating force of the dome cover 16 about the center axis z1 (pan axis) of the base part 12 of the dome cover 16 is transmitted as a rotating force of the focus adjustment ring 38 about the optical axis z2 of the camera body 10 varying with the orientation of the camera body 10, and therefore the power is transmitted via the second power transmission member 202 placed on the axis of the tilt axis t1 and rotating about the tilt axis t1, and power transmission can be performed at whichever tilt angle the camera body 10 is supported. Unlike the above embodiment, the second power transmission member 202 may not be a tilt shaft member which supports the tilt-purpose rotating table 82, and may be rotatably supported about the tilt axis t1 at any location on the tilt axis t1. Also, the structure of a gear line (a first gear line) until the rotating force of the dome cover 16 is transmitted as a rotating force of a power transmission member rotating about the tilt axis t1 (corresponding to the second power transmission member 202 in the above embodiment) and the structure of a gear line (a second gear line) until the rotating force of that power transmission member is transmitted as a rotating force of the focus adjustment ring 38 are not restricted to that of the above embodiment, and can be any structure.

Furthermore, in the above embodiment, the first power transmission member 200 mounted on the dome cover 16 may be integrally formed with the dome cover 16, and the first gear 250 may be formed at the rear end part of the dome cover 16.

Still further, in the above embodiment, one rotating member and the other rotating member are coupled together with a gearwheel (gear), such as the first power transmission member 200 and the second power transmission member 202, the second power transmission member 202 and the third power transmission member 204, and the third power transmission member 204 and the focus adjustment ring 38. Part or entire of these may be coupled together with a friction gear. Furthermore, the rotating force between the second gear 304 and the fifth gear 362 may be transmitted by a flexible shaft with flexibility. In this case, it is preferable that the flexible shaft is deployed as being inserted into the tilt shaft hole 92a formed in the support part 94 of the pan-purpose rotating table 80 where the tilt shaft member 86 is placed and the tilt shaft hole 100a formed in the swing arm part 100 of the tilt-purpose rotating table 82, thereby preventing the flexible shaft from obstructing placement of another member. The structure of the cover-interlocked-type focus adjustment mechanism in this case is exemplarily depicted in FIG. 14. Note in FIG. 14 that a member identical to a member depicted in FIG. 12 or having an operation similar to that of the member depicted in FIG. 12 is provided with the same reference character, and is not described herein.

Figure 14:
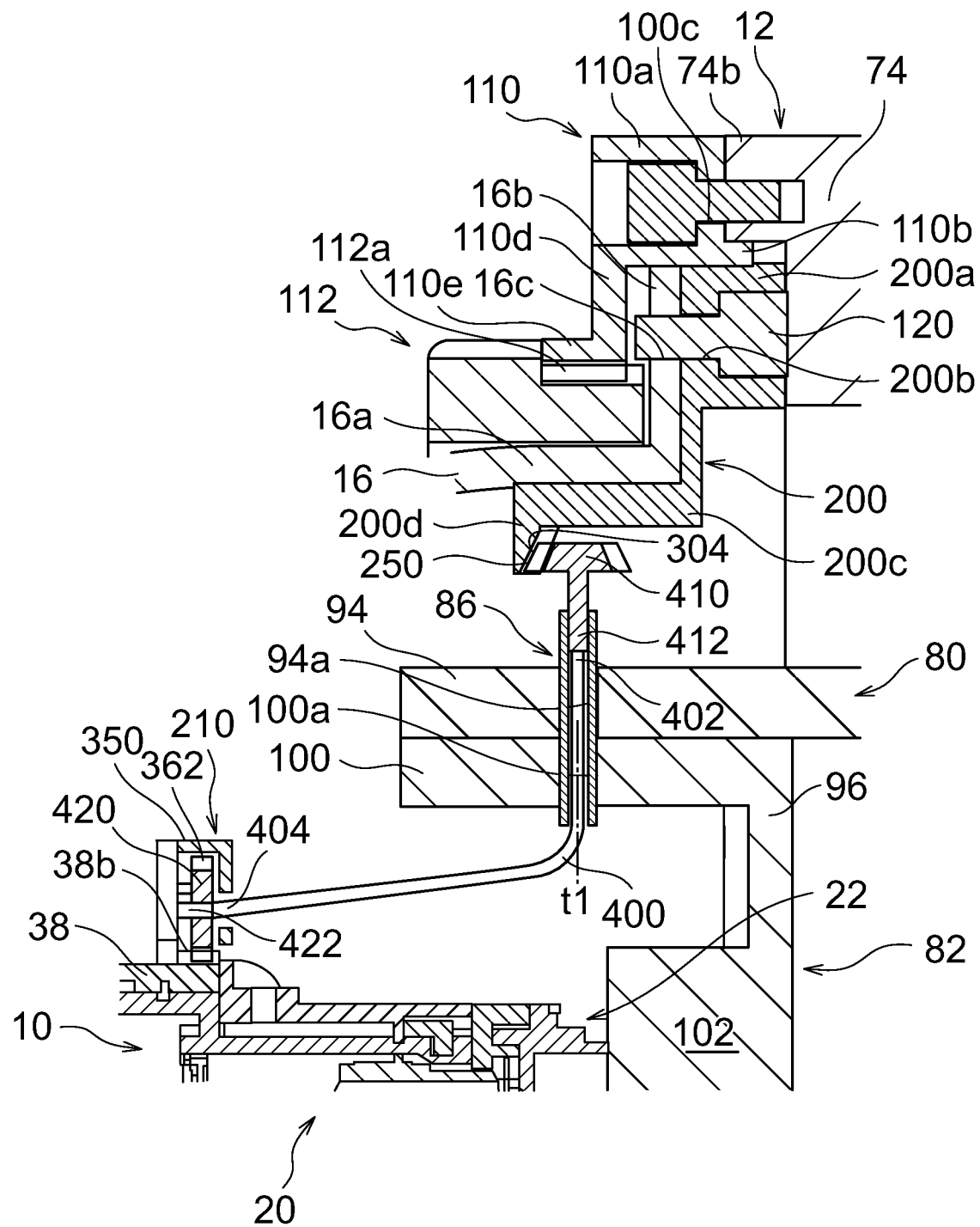
FIG. 14 is a sectional view of a cover-interlocked-type focus adjustment mechanism of another embodiment correspondingly to the structural diagram of FIG. 12.

As depicted in FIG. 14, the second gear 304 is formed on an outer circumferential end face of a disk-shaped gearwheel forming member 410, and its rotating shaft 412 is inserted from an outside end part opening into an inner hole of the tilt shaft member 86 formed in a cylindrical shape, and is rotatably supported. And, a flexible shaft 400 has one end part 402 fixed to the rotating shaft 412.

The flexible shaft 400 passes through the inside of the tilt shaft member 86 to go out from an inside end part opening of the tilt shaft member 86, and has the other end part 404 fixes to a rotating shaft 422 of a gearwheel forming member 420. The gearwheel forming member 420 is rotatably supported by the frame body 350 of the gearwheel supporting part 210 via the rotating shaft 422, and has an outer circumferential end face formed with the fifth gear 362. And, the fifth gear 362 is engaged with the sixth gear 38b of the focus adjustment ring 38.

According to this, when the first power transmission member 200 rotates by a rotating operation on the dome cover 16, the gearwheel forming member 410 rotates via the first gear 250 and the second gear 304, and its rotating force is transmitted to the gearwheel forming member 420 via the flexible shaft 400 to rotate the gearwheel forming member 420. With this, the focus adjustment ring 38 rotates via the fifth gear 362 and the sixth gear 38b.

What is claimed is:

1. A dome-shaped camera comprising:
    a camera body including a focus adjustment ring for manually performing focus adjustment;
    a base part which supports the camera body and includes a tilt mechanism which changes an angle of a tilt direction for supporting the camera body;
    a dome cover which covers the camera body;
    a mount device which mounts the dome cover on the base part so that the dome cover is rotatable about a center axis of the dome cover; and
    a power transmitting device which transmits a rotating force in a direction about the center axis added to the dome cover as a rotating force of a focus adjustment ring of the camera supported at any angle in the tilt direction via a power transmission member placed on a tilt axis.

2. The dome-shaped camera according to claim 1, wherein the power transmitting device includes
    a first gear line which transmits the rotating force of the dome cover about the center axis as a rotating force of the power transmission member about the tilt axis, and
    a second gear line which transmits the rotating force transmitted from the dome cover to the power transmission member as a rotating force of the focus adjustment ring.

3. The dome-shaped camera according to claim 2, wherein the first gear line includes a first gear placed in a circumferential shape about the center axis at a rear end part of the dome cover, and a second gear provided to the power transmission member and coupled to the first gear, and
    the second gear line includes a third gear provided to the power transmission member, a fourth gear provided to a rotating member rotatably supported about an axis parallel to a rotation axis of the focus adjustment ring, the fourth gear coupled to the third gear, a fifth gear provided to the rotating member, and a sixth gear provided to the focus adjustment ring, the sixth gear coupled to the fifth gear.

4. The dome-shaped camera according to claim 3, wherein the first gear is formed on a rotating member fixed to the rear end part of the dome cover.

5. The dome-shaped camera according to claim 1, comprising a regulating device which regulates rotation of the dome cover.

6. The dome-shaped camera according to claim 1, wherein the mount device includes a cover fixing ring in an annular shape fixed to the base part, and a flange part formed at the rear end part of the dome cover is interposed between the cover fixing ring and the base part.

7. The dome-shaped camera according to claim 6, wherein the mount device includes a cover rotation fixing ring in an annular shape screwed into an inner circumferential part of the cover fixing ring, and the dome-shaped camera comprises a regulating device which regulates rotation of the dome cover by pressing the flange part onto the base part by the cover rotation fixing ring.

8. The dome-shaped camera according to claim 1, wherein the base part includes a pan mechanism which changes an angle of a pan direction of supporting the camera body.

9. The dome-shaped camera according to claim 1, wherein the camera body has a varifocal lens as a lens barrel.

\* \* \* \* \*